(12) United States Patent
Bai et al.

(10) Patent No.: US 11,451,971 B2
(45) Date of Patent: Sep. 20, 2022

(54) NETWORKING METHOD, NETWORKING APPARATUS, NETWORK ACCESS METHOD, AND USER EQUIPMENT FOR COORDINATED MULTIPLE POINTS TRANSMISSION/RECEPTION

(71) Applicant: HUAWEI TECHNOLOGIES CO., LTD., Guangdong (CN)

(72) Inventors: Bo Bai, Hong Kong (CN); Lin Dai, Hong Kong (CN)

(73) Assignee: Huawei Technologies Co., Ltd., Guangdong (CN)

( * ) Notice: Subject to any disclaimer, the term of this patent is extended or adjusted under 35 U.S.C. 154(b) by 128 days.

(21) Appl. No.: 16/834,389

(22) Filed: Mar. 30, 2020

(65) Prior Publication Data

US 2020/0228998 A1 Jul. 16, 2020

Related U.S. Application Data

(63) Continuation of application No. PCT/CN2018/112973, filed on Oct. 31, 2018.

(30) Foreign Application Priority Data

Nov. 17, 2017 (CN) .......................... 201711146450.1

(51) Int. Cl.
*H04W 16/18* (2009.01)
*H04L 5/00* (2006.01)
(Continued)

(52) U.S. Cl.
CPC .......... *H04W 16/18* (2013.01); *H04L 5/0048* (2013.01); *H04L 41/0806* (2013.01); *H04W 24/10* (2013.01)

(58) Field of Classification Search
CPC ... H04W 16/18; H04W 24/10; H04W 88/085; H04W 48/20; H04W 24/02; H04L 5/0048; H04L 41/0806; H04L 5/0035
See application file for complete search history.

(56) References Cited

U.S. PATENT DOCUMENTS

2012/0224541 A1 9/2012 Yoshiuchi et al.
2012/0314665 A1* 12/2012 Ishida .................... H01Q 1/246
370/329

(Continued)

FOREIGN PATENT DOCUMENTS

CN 102256350 A 11/2011
CN 107172635 A 9/2017

OTHER PUBLICATIONS

Yu et al., "Multi-Resource Allocation in Cloud Radio Access Networks", IEEE ICC 2017 Next Generation Networking and Internet Symposium (Year: 2017).*

(Continued)

*Primary Examiner* — Justin T Van Roie
(74) *Attorney, Agent, or Firm* — Fish & Richardson P.C.

(57) ABSTRACT

This application provides a networking method, a networking apparatus, a network access method, and user equipment. The networking method includes: determining a network association relationship between each remote radio unit (RRU) and each user equipment (UE) for all RRUs and all UEs managed by a baseband processing unit (BBU) resource pool, where the network association relationship includes whether the RRU is capable of providing a service for the UE, or a relationship between the UE and the RRU represented by a reference signal received power that corresponds to each RRU and that is reported by the UE; and configuring all the RRUs to M subnets based on the network association relationship between each RRU and each UE, (Continued)

where M≥1, and M is not greater than a quantity of all the RRUs.

14 Claims, 11 Drawing Sheets

(51) Int. Cl.
    *H04L 41/0806*     (2022.01)
    *H04W 24/10*     (2009.01)

(56) References Cited

U.S. PATENT DOCUMENTS

| | | |
|---|---|---|
| 2014/0226736 A1 | 8/2014 | Niu et al. |
| 2014/0349667 A1 | 11/2014 | Hahn et al. |
| 2016/0192181 A1 | 6/2016 | Choi et al. |
| 2017/0180982 A1 | 6/2017 | Choi et al. |

OTHER PUBLICATIONS

Zhu et al., "Traffic and Interference-aware Dynamic BBU-RRU Mapping in C-RAN TDD with Cross-subframe Coordinated Scheduling/Beamforming", IEEE International Conference on Communications 2013: IEEE ICC'13—Workshop on Optical Wireless Integrated Technology for Systems and Networks 2013 (Year: 2013).*

Dang et al., "Discriminative Subnetworks with Regularized Spectral Learning for Global-state Network Data", Dec. 15, 2015, Department of Computer Science, University of California Santa Barbara, USA (Year: 2015).*

Extended European Search Report issued in European Application No. 18877447.5 dated Oct. 19, 2020, 10 pages.

Liu et al., "Randomized user-centric clustering for cloud radio access network with PHY caching," 2015 IEEE Global Conference on Signal and Information Processing (GLOBALSIP), IEEE, Dec. 14, 2015, 6 pages.

Rahman et al., "RRH Clustering and Transmit Precoding for Interference-Limited 5G CRAN Downlink," 2015 IEEE GLOBECOM Workshops (GC WKSHPS), IEEE, Dec. 6, 2015, 8 pages.

Dai et al. Optimal Decomposition for Large-Scale Infrastructure-Based Wireless Networks, IEEE Transactions on Wireless Communications, vol. 16, No. 8, Aug. 2017, 14 page.

Donald, "Advanced mobile phone service: the cellular concept," Bell Syst. Tech. J., vol. 58, No. 1, Jan. 1979, 27 pages.

3GPP TR 36.819 V11.2.0 (Sep. 2013), 3rd Generation Partnership Project, Technical Specification Group Radio Access Network, Coordinated multi-point operation for LTE physical layer aspects(Release 11), 70 pages.

3GPP TR 38.913 V14.2.0 (Mar. 2017),3rd Generation Partnership Project, Technical Specification Group Radio Access Network, Study on Scenarios and Requirements for Next Generation Access Technologies;(Release 14), Mar. 24, 2019, 38 pages.

Shi et al., "Group sparse beamforming for green cloud-RAN," IEEE Trans. Wireless Commun., vol. 13, No. 5, May 2014, 15 pages.

3GPP TR 38.801 V14.0.0 (Mar. 2017);3rd Generation Partnership Project, Technical Specification Group Radio Access Network, Study on new radio access technology, Radio access architecture and interfaces(Release 14), 91 pages.

3GPP TR 38.802 V14.0.0 (Mar. 2017), 3rd Generation Partnership Project, Technical Specification Group Radio Access Network, Study on New Radio Access Technology Physical Layer Aspects(Release 14), 143 pages.

3GPP TS 36.213 V14.2.0 (Mar. 2017),3rd Generation Partnership Project, Technical Specification Group Radio Access Network, Evolved Universal Terrestrial Radio Access (E-UTRA), Physical layer procedures(Release 14), Mar. 2017, 454 pages.

China Mobile Research Institute, "C-RAN Green Evolution White Paper v2.5", Oct. 2011, 43 pages (With English Abstract).

Office Action issued in Chinese Application No. 201711146450.1 dated Apr. 13, 2020, 17 pages (With English Translation).

PCT International Search Report and Written Opinion in International Application No. PCT/CN2018/112,973, dated Jan. 24, 2019, 11 pages (With Partial English Translation).

\* cited by examiner

NETWORKING METHOD, NETWORKING APPARATUS, NETWORK ACCESS METHOD, AND USER EQUIPMENT FOR COORDINATED MULTIPLE POINTS TRANSMISSION/RECEPTION

CROSS-REFERENCE TO RELATED APPLICATIONS

This application is a continuation of International Application No. PCT/CN2018/112973, filed on Oct. 31, 2018, which claims priority to Chinese Patent Application No. 201711146450.1, filed on Nov. 17, 2017. The disclosures of the aforementioned applications are hereby incorporated by reference in their entireties.

TECHNICAL HELD

The present invention relates to the field of wireless communications technologies, and more specifically, to a networking method, a networking apparatus, a network access method, and user equipment.

BACKGROUND

Since the Bell Labs proposed the cellular technology in 1979, the 1st generation to 4th generation mobile communications technologies all use a network organization form in which user equipment (User Equipment, UE) accesses a base station having highest average receive power. With development of technologies, a coordinated multipoint transmission/reception (Coordinated Multiple Points Transmission/Reception, CoMP) CoMP technology is proposed in the 4th generation mobile communications standard release R11. In the CoMP technology, a plurality of base stations constitute a fixed service set, and a user accesses a service set having highest average receive power. All base stations in the service set can simultaneously serve UE by using a precoding technology, to improve a transmission rate of the UE. However, when edge UE accesses the service set, the UE encounters strong interference from another service set nearby. Therefore, it is difficult to efficiently improve overall performance of a mobile communications network by using the CoMP technology.

Currently, the 5th generation mobile communications (The 5th Generation Mobile Communications, 5G) system has become a focus in the industrial community and the academic community. An existing standard defines that 5G may be deployed in connection scenarios such as an indoor hotspot, a densely populated urban area, a rural area, high mobility, an Internet of vehicles, and massive; and can provide peak rates of 20 gigabits per second (Gbps) in a downlink and 10 Gbps in an uplink. Neither of a conventional cellular network and the COMP technology in the long term evolution (Long Term Evolution, LTE) standard can meet a stringent performance requirement of the 5G system. Therefore, developing a new wireless network technology to meet challenges posed by 5G has become a hot research area in the academic community, and is also a problem that needs to be resolved urgently in the industrial community.

To improve network performance, usually all remote radio units (Remote Radio Unit, RRU) are completely coordinated to process signals, to provide services for all UEs in a coverage area. During implementation, each RRU needs to allow all UEs to simultaneously access the RRU, and each UE may simultaneously access all the RRUs. Currently, there are mainly two solutions of serving all UEs based on an RRU full cooperation manner.

A first solution is to maximize overall rate performance of a network. In this solution, a BBU resource pool needs to calculate a global precoding matrix for each UE, and adjust a precoding weight of an antenna of each RRU, to maximize overall rate performance of a 5G network. A second solution is to minimize overall energy consumption of a network. In this solution, a minimum rate requirement of each UE is introduced, and most energy-efficient wireless UE access is implemented by disabling an RRU.

In a 5G-oriented cloud radio access network (Cloud Radio Access Network, C-RAN) architecture, a BBU is usually connected to a large quantity of RRUs, and covers a large quantity of UEs. In both the solution of maximizing overall rate performance of a network and the solution of minimizing overall energy consumption of a network, a large scale of optimization problems need to be solved, and the solving is highly complex. Therefore, neither of the two solutions can meet a real-time requirement of a 5G mobile communications network.

SUMMARY

This application provides a networking method, a networking apparatus, a network access method, and user equipment, to effectively reduce a network communication latency and improve overall network performance.

According to a first aspect, this application provides a networking method. The networking method includes: determining a network association relationship between each RRU and each UE of all RRUs and all UEs managed by a baseband processing unit (Base Band Unit, BBU) resource pool, where the network association relationship includes whether the RRU is capable of providing a service for the UE, or reference signal received power that corresponds to each RRU and that is reported by UE is used to represent a relationship between the UE and the RRU; and configuring all the RRUs to M subnets based on the network association relationship between each RRU and each UE, where M≥1, and M is not greater than a quantity of all the RRUs.

In this application, all the RRUs in the BBU resource pool are configured to several subnets according to a network association relationship between an RRU and UE in a network, to divide an entire service network corresponding to the BBU resource pool. Each subnet corresponds to an RRU of the subnet, so that each BBU in the BBU resource pool needs to manage only one or more subnets corresponding to the BBU. This can greatly reduce complexity of network resource allocation and signal processing in a subnet, thereby reducing a network communication latency and improving overall network performance.

With reference to the first aspect, in a first implementation of the first aspect, the determining a network association relationship between each remote radio unit RRU and each user equipment UE of all RRUs and all UEs managed by a baseband processing unit BBU resource pool includes: obtaining a network association relationship between each of all the RRUs and each UE that is managed by each BBU in the BBU resource pool; and determining, based on the network association relationship between each of all the RRUs and each UE that is managed by each BBU in the BBU resource pool, the network association relationship between each RRU and each UE of all the RRUs and all the UEs managed by the BBC resource pool.

With reference to the first aspect or the foregoing implementation of the first aspect, in a second implementation of the first aspect, the determining a network association relationship between each remote radio unit RRU and each user equipment UE of all RRUs and all UEs managed by a baseband processing unit BBU resource pool includes: obtaining the reference signal received power that corresponds to each RRU and that is measured and reported by each UE; and determining, based on the reference signal received power that corresponds to each RRU and that is measured and reported by each UE, the network association relationship between each RRU and each UE of all the RRUs and all the UEs managed by the BBU resource pool.

With reference to the first aspect or the foregoing implementation of the first aspect, in a third implementation of the first aspect, if the network association relationship is whether the RRU is capable of providing a service for the UE, the determining a network association relationship between each remote radio unit RRU and each user equipment UE of all RRUs and all UEs managed by a baseband processing unit BBU resource pool includes: obtaining an identifier of each RRU corresponding to the reference signal received power that is measured and reported by each UE; determining, based on the identifier of each RRU corresponding to the reference signal received power that is measured and reported by each UE, an RRU that is capable of providing a service for the UEs managed by the BBU resource pool; and determining, based on the RRU that is capable of providing a service for the UEs managed by the BBU resource pool, the network association relationship between each RRU and each UE of all the RRUs and all the UEs managed by the BBU resource pool.

With reference to the first aspect or the foregoing implementation of the first aspect, in a fourth implementation of the first aspect, the identifier of each RRU corresponding to the reference signal received power that is measured and reported by each UE is an identifier of each RRU corresponding to reference signal received power that is of the reference signal received power measured by the UE and that is greater than a preset power threshold.

With reference to the first aspect or the foregoing implementation of the first aspect, in a fifth implementation of the first aspect, the configuring all the RRUs to M subnets based on the network association relationship between each RRU and each UE includes: determining a value of M; and configuring all the RRUs to M subnets according to a clustering algorithm and based on the network association relationship between each RRU and each UE.

In this application, by using this solution, an RRU configured in each subnet after the clustering is determined based on a network association relationship between the RRU and UE, so that a clustering result is more suitable for an actual scenario, thereby improving network access quality of the UE in each subnet.

With reference to the first aspect or the foregoing implementation of the first aspect, in a sixth implementation of the first aspect, the configuring all the RRUs to M subnets according to a clustering algorithm and based on the network association relationship between each RRU and each UE includes: establishing a current relational matrix of the BBU resource pool based on the network association relationship between each RRU and each UE, where a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and clustering, according to the clustering algorithm, RRUs and UEs corresponding to elements in the current relational matrix, and configuring all the RRUs to M subnets based on a clustering result.

With reference to the first aspect or the foregoing implementation of the first aspect, in a seventh implementation of the first aspect, the clustering, according to the clustering algorithm, RRUs and UEs corresponding to elements in the current relational matrix, and configuring all the RRUs to M subnets based on a clustering result includes: calculating a Laplacian matrix of the current relational matrix and all eigenvectors of the Laplacian matrix; sorting all the eigenvectors in ascending order of eigenvalues corresponding to the eigenvectors, and constructing an eigenmatrix by using each of first M eigenvectors obtained after the ascending sorting as one column; rotating subspace corresponding to the eigemnatrix, to obtain a subnet matrix that corresponds to the eigenmatrix and that has only one nonzero element in each row, where each column in the subnet matrix corresponds to one subnet, and the nonzero element in each column is an RRU and UE of a subnet corresponding to the column; and configuring the RRU of each subnet to the corresponding subnet.

With reference to the first aspect or the foregoing implementation of the first aspect, in an eighth implementation of the first aspect, the rotating subspace corresponding to the eigemnatrix includes: rotating the subspace corresponding to the eigenmatrix by a minimum distance.

In this application, the subspace corresponding to the eigenmatrix is rotated by the minimum distance, to minimize a difference between the subnet matrix that is obtained after the rotation and the eigenmatrix, thereby minimizing impact of the spatial rotation on a network configuration result.

With reference to the first aspect or the foregoing implementation of the first aspect, in a ninth implementation of the first aspect, the determining a value of M includes: determining, as the value of M based on a value range of M, a maximum value that is within the value range and that meets a preset subnetting rule, where the subnetting rule includes: a reciprocal of a sum of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

In this application, by using the subnetting rule, the entire service network of the BBU resource pool is divided into as many subnets as possible, and it is also ensured that interference between all the subnets obtained after the division is controlled within a specified threshold. This minimizes complexity of resource configuration and signal processing in the subnets, and also ensures overall network performance.

With reference to the first aspect or the foregoing implementation of the first aspect, in a tenth implementation of the first aspect, the Laplacian matrix is a random walk Laplacian matrix.

With reference to the first aspect or the foregoing implementation of the first aspect, in an eleventh implementation of the first aspect, the maximum value is a maximum numerical value that is found in the value range by using a binary search method and that meets the subnetting rule.

With reference to the first aspect or the foregoing implementation of the first aspect, in a twelfth implementation of the first aspect, before cluster analysis is performed, according to the clustering algorithm, on the RRUs and the UEs corresponding to the elements in the current relational matrix, the method further includes: determining, based on the current relational matrix and a relational matrix of a previous moment, that the current relational matrix meets a preset networking update condition.

With reference to the first aspect or the foregoing implementation of the first aspect, in a thirteenth implementation of the first aspect, the networking update condition includes: an L2 norm of a matrix that is obtained by performing a subtraction operation between the relational matrix of the previous moment and the current relational matrix is greater than a specified threshold.

In this application, before networking configuration is performed again, whether a network obtained after previous networking configuration is stable and whether re-subnetting is required are evaluated by using an L2 norm of a difference between the relational matrix of the previous moment and the current relational matrix. This avoids a case in which subnet configuration results before and after re-networking slightly change, that is, re-networking is not required, thereby effectively saving computing resources.

With reference to the first aspect or the foregoing implementation of the first aspect, in a fourteenth implementation of the first aspect, after the configuring all the RRUs to M subnets based on the network association relationship between each RRU and each UE, the method further includes: mapping an RRU of each subnet to a BBU in the BBU resource pool based on an RRU configuration result of the M subnets, so that the BBU performs networking configuration for the RRU of the corresponding subnet based on a mapping result, where one subnet corresponds to at least one BBU.

With reference to the first aspect or the foregoing implementation of the first aspect, in a fifteenth implementation of the first aspect, the mapping an RRU of each subnet to a BBU in the BBU resource pool includes: if M is greater than a quantity of BBUs in the BBU resource pool, mapping an RRU of each subnet to a BBU in the BBU resource pool based on a quantity of RRUs in each subnet, where after the mapping, a difference between a maximum value of corresponding RRU quantities of the BBUs and a minimum value of the corresponding RRU quantities of the BBUs is less than a specified value.

In this application, by using this solution, a difference between quantities of RRUs in the subnets is within the specified value, so that a scale of each subnet after the networking is controllable.

With reference to the first aspect or the foregoing implementation of the first aspect, in a sixteenth implementation of the first aspect, a BBU in each subnet serves only an RRU in the corresponding subnet, and the RRU in each subnet provides a service only for UE in a coverage area of the corresponding subnet.

With reference to a second aspect, this application provides a network access method. The access method is performed by UE, and the access includes: receiving, by the UE, a networking update instruction delivered by a BBU in a BBU resource pool, where the networking update instruction includes an RRU service set of the UE; and accessing, by the UE, a network by using an RRU in the RRU service set.

With reference to the second aspect, in a first implementation of the second aspect, before the receiving, by the UE, a networking update instruction delivered by a BBU in a BBU resource pool, the method further includes: reporting, by the UE, an identifier of each RRU corresponding to reference signal received power measured by the UE to a BBU that is in the BBU resource pool and to which the UE currently belongs.

With reference to the second aspect or the foregoing implementation of the second aspect, in a second implementation of the second aspect, the reporting, by the UE, an identifier of each RRU corresponding to reference signal received power measured by the UE to a BBU that is in the BBU resource pool and to which the UE currently belongs includes: reporting, by the UE to the BBU that is in the BBU resource pool and to which the UE currently belongs, an identifier of each RRU corresponding to reference signal received power that is of the reference signal received power measured by the UE and that is greater than a preset power threshold.

With reference to a third aspect, this application provides a networking apparatus. The apparatus includes: a network association relationship determining module, configured to determine a network association relationship between each RRU and each UE of all RRUs and all UEs managed by a baseband processing unit BBU resource pool, where the network association relationship includes whether the RRU is capable of providing a service for the UE, or reference signal received power that corresponds to each RRU and that is reported by UE is used to represent a relationship between the UE and the RRU; and a subnet configuration module, configured to configure all the RRUs to M subnets based on the network association relationship between each RRU and each UE, where M≥1, and M is not greater than a quantity of all the RRUs.

With reference to the third aspect, in a first implementation of the third aspect, the network association relationship determining module is specifically configured to: obtain a network association relationship between each of all the RRUs and each UE that is managed by each BBU in the BBU resource pool; and determine, based on the network association relationship between each of all the RRUs and each UE that is managed by each BBU in the BBU resource pool, the network association relationship between each RRU and each UE of all the RRUs and all the UEs managed by the BBU resource pool.

With reference to the third aspect or the foregoing implementation of the third aspect, in a second implementation of the third aspect, the network association relationship determining module is specifically configured to: obtain the reference signal received power that corresponds to each RRU and that is measured and reported by each UE; and determine, based on the reference signal received power that corresponds to each RRU and that is measured and reported by each UE, the network association relationship between each RRU and each UE of all the RRUs and all the UEs managed by the BBU resource pool.

With reference to the third aspect or the foregoing implementation of the third aspect, in a third implementation of the third aspect, if the network association relationship is whether the RRU is capable of providing a service for the UE, the network association relationship determining module is specifically configured to: obtain an identifier of each RRU corresponding to the reference signal received power that is measured and reported by each UE; determine, based on the identifier of each RRU corresponding to the reference signal received power that is measured and reported by each UE, an RRU that is capable of providing a service for the UEs managed by the BBU resource pool; and determine, based on the RRU that is capable of providing a service for the UEs managed by the BBU resource pool, the network association relationship between each RRU and each UE of all the RRUs and all the UEs managed by the BBU resource pool.

With reference to the third aspect or the foregoing implementation of the third aspect, in a fourth implementation of the third aspect, the identifier of each RRU corresponding to the reference signal received power that is measured and reported by each UE is an identifier of each RRU corresponding to reference signal received power that is of the reference signal received power measured by the UE and that is greater than a preset power threshold.

With reference to the third aspect or the foregoing implementation of the third aspect, in a fifth implementation of the third aspect, the subnet configuration module is specifically configured to: determine a value of M; and configure all the RRUs to M subnets according to a clustering algorithm and based on the network association relationship between each RRU and each UE.

With reference to the third aspect or the foregoing implementation of the third aspect, in a sixth implementation of the third aspect, when configuring all the RRUs to M subnets according to the clustering algorithm and based on the network association relationship between each RRU and each UE, the subnet configuration module is specifically configured to: establish a current relational matrix of the BBU resource pool based on the network association relationship between each RRU and each UE, where a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and cluster, according to the clustering algorithm, RRUs and UEs corresponding to elements in the current relational matrix, and configure all the RRUs to M subnets based on a clustering result.

With reference to the third aspect or the foregoing implementation of the third aspect, in a seventh implementation of the third aspect, when clustering, according to the clustering algorithm, the RRUs and the UEs corresponding to the elements in the current relational matrix, and configuring all the RRUs to M subnets based on the clustering result, the subnet configuration module is specifically configured to: calculate a Laplacian matrix of the current relational matrix and all eigenvectors of the Laplacian matrix; sort all the eigenvectors in ascending order of eigenvalues corresponding to the eigenvectors, and construct an eigenmatrix by using each of first M eigenvectors obtained after the ascending sorting as one column; rotate subspace corresponding to the eigenmatrix, to obtain a subnet matrix that corresponds to the eigenmatrix and that has only one nonzero element in each row, where each column in the subnet matrix corresponds to one subnet, and the nonzero element in each column is an RRU and UE of a subnet corresponding to the column; and configure the RRU of each subnet to the corresponding subnet.

With reference to the third aspect or the foregoing implementation of the third aspect, in an eighth implementation of the third aspect, when rotating the subspace corresponding to the eigenmatrix, the subnet configuration module is specifically configured to rotate the subspace corresponding to the eigenmatrix by a minimum distance.

With reference to the third aspect or the foregoing implementation of the third aspect, in a ninth implementation of the third aspect, when determining the value of M, the subnet configuration module is specifically configured to: determine, as the value of M based on a value range of M, a maximum value that is within the value range and that meets a preset subnetting rule, where the subnetting rule includes: a reciprocal of a sum of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

With reference to the third aspect or the foregoing implementation of the third aspect, in a tenth implementation of the third aspect, the Laplacian matrix is a random walk Laplacian matrix.

With reference to the third aspect or the foregoing implementation of the third aspect, in an eleventh implementation of the third aspect, the maximum value is a maximum numerical value that is found in the value range by using a binary search method and that meets the subnetting rule.

With reference to the third aspect or the foregoing implementation of the third aspect, in a twelfth implementation of the third aspect, the networking apparatus further includes a networking update determining module, configured to: before cluster analysis is performed, according to the clustering algorithm, on the RRUs and the UEs corresponding to the elements in the current relational matrix, determine, based on the current relational matrix and a relational matrix of a previous moment, that the current relational matrix meets a preset networking update condition.

With reference to the third aspect or the foregoing implementation of the third aspect, in a thirteenth implementation of the third aspect, the networking update condition includes: an L2 norm of a matrix that is obtained by performing a subtraction operation between the relational matrix of the previous moment and the current relational matrix is greater than a specified threshold.

With reference to the third aspect or the foregoing implementation of the third aspect, in a fourteenth implementation of the third aspect, the networking apparatus further includes: a configuration result mapping module, configured to: after all the RRUs are configured to M subnets based on the network association relationship between each RRU and each UE, map an RRU of each subnet to a BBU in the BBU resource pool based on an RRU configuration result of the M subnets, so that the BBU performs networking configuration for the RRU of the corresponding subnet based on a mapping result, where one subnet corresponds to at least one BBU.

With reference to the third aspect or the foregoing implementation of the third aspect, in a fifteenth implementation of the third aspect, the configuration result mapping module is specifically configured to: when M is greater than a quantity of BBUs in the BBU resource pool, map an RRU of each subnet to a BBU in the BBU resource pool based on a quantity of RRUs in each subnet, where after the mapping, a difference between a maximum value of corresponding RRU quantities of the BBUs and a minimum value of the corresponding RRU quantities of the BBUs is less than a specified value.

With reference to the third aspect or the foregoing implementation of the third aspect, in a sixteenth implementation of the third aspect, a BBU in each subnet serves only an RRU in the corresponding subnet, and the RRU in each subnet provides a service only for UE in a coverage area of the corresponding subnet.

With reference to a fourth aspect, this application provides user equipment. The user equipment includes: a networking update instruction receiving module, configured to receive a networking update instruction delivered by a BBU in a BBU resource pool, where the networking update instruction includes an RRU service set of the UE; and a network access module, configured to access a network by using an RRU in the RRU service set.

With reference to the fourth aspect, in a first implementation of the fourth aspect, the user equipment further includes an RRU identifier reporting module, configured to: before the networking update instruction delivered by the BBU in the BBU resource pool is received, report an identifier of each RRU corresponding to measured reference signal received power to a BBU that is in the BBU resource pool and to which the UE currently belongs.

With reference to the fourth aspect or the foregoing implementation of the fourth aspect, in a fourth implementation of the fourth aspect, the RRU identifier reporting module is specifically configured to: report, to the BBU that is in the BBU resource pool and to which the UE currently belongs, an identifier of each RRU corresponding to reference signal received power that is of the measured reference signal received power and that is greater than a preset power threshold.

With reference to a fifth aspect, this application provides a networking device. The networking device includes a processor and a memory. The memory stores a computer program, and the processor is configured to execute the computer program in the memory to implement the networking method according to the first aspect.

With reference to a sixth aspect, this application provides a computer readable storage medium. The readable storage medium stores an instruction, and when run on a computer, the instruction enables the computer to perform the networking method according to the first aspect.

With reference to a seventh aspect, this application provides user equipment. The user equipment includes a processor and a memory. The memory stores a computer program, and the processor is configured to execute the computer program in the memory to implement the network access method according to the second aspect.

With reference to an eighth aspect, this application provides a computer readable storage medium. The readable storage medium stores an instruction, and when run on a computer, the instruction enables the computer to perform the network access method according to the second aspect.

Figure 15:
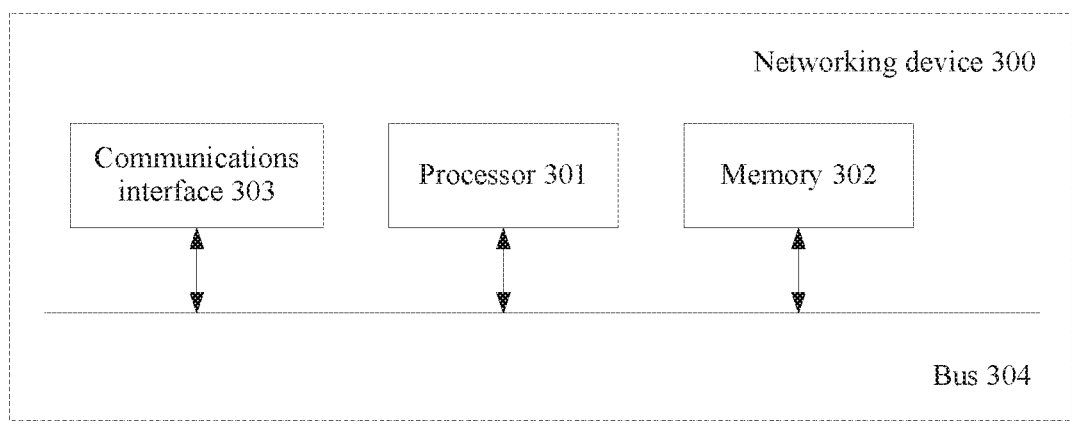
Figure 16:
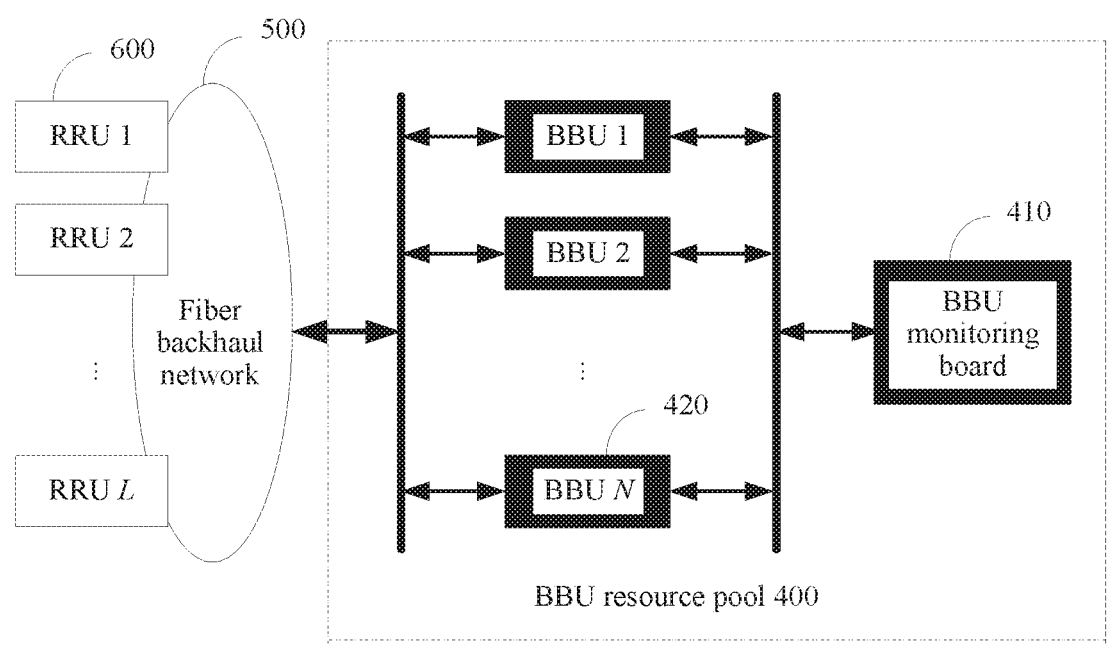

FIG. is a schematic block diagram of user equipment according to an embodiment of the present invention;

FIG. 15 is a schematic block diagram of a networking device according to an embodiment of the present invention; and FIG. 16 is a schematic diagram of a logical architecture of a BBU resource pool according to an embodiment of the present invention.

DESCRIPTION OF EMBODIMENTS

The technical solutions according to the embodiments of the present invention are clearly and completely described in the following with reference to the accompanying drawings.

The embodiments of the present invention provide a networking method, a networking apparatus, a network access method, and user equipment. The solutions of the embodiments of the present invention may be applied to a wireless communications system that is based on a C-RAN network architecture, and may also be applied to a wireless communications system that is based on a software-defined networking (Software Defined Network, SDN). The wireless communications system may include but is not limited to a 4G system and a 5G system.

Figure 1:
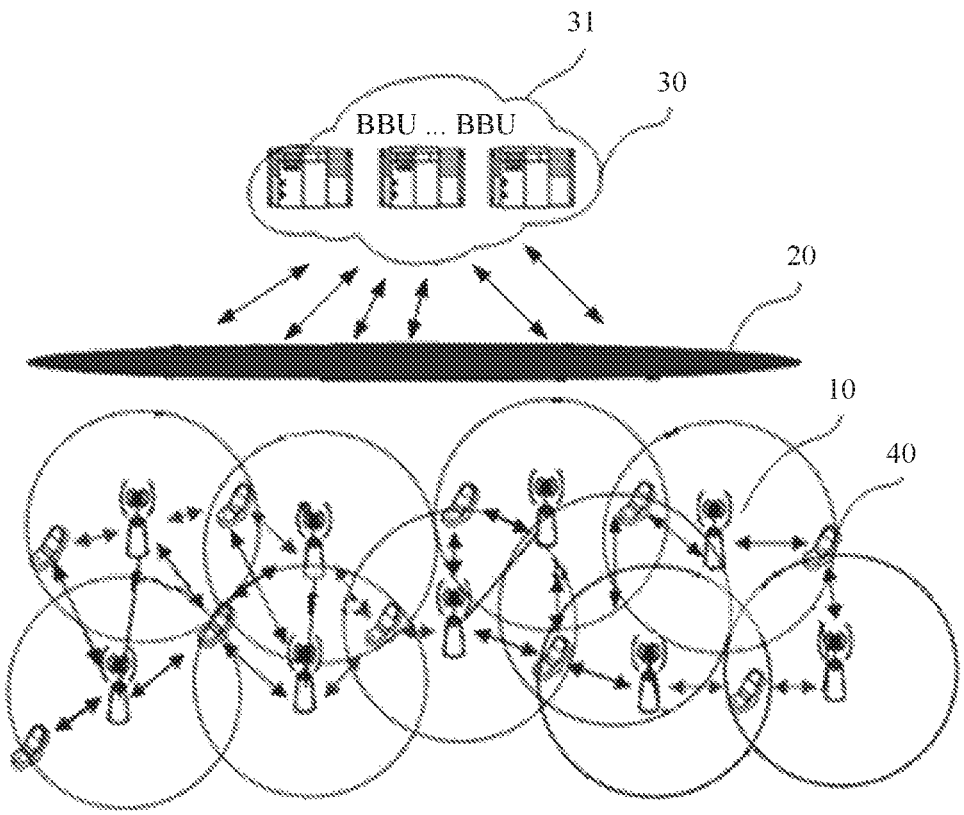
FIG. 1 is a schematic diagram of a network architecture applicable to an embodiment of the present invention.

FIG. 1 is a schematic diagram of a C-RAN network architecture applicable to an embodiment of the present invention. As shown in FIG. 1, the C-RAN network architecture may mainly include a large quantity of RRUs 10, a large-capacity fiber backhaul network 20, and a virtual base station cluster (which may also be referred to as a centralized baseband processing pool and is referred to as a BBU resource pool 30 in this embodiment of the present invention). The BBU resource pool 30 is implemented by using a high-performance general-purpose processor and a real-time virtual technology.

In the C-RAN network architecture, the BBU resource pool 30 completes functions such as network organization, resource allocation, and baseband signal processing. The BBU resource pool 30 includes a plurality of BBUs 31, and each BBU 31 manages some RRUs 10. UE 40 accesses a network by using an RRU 10, and the large quantity of RRUs 10 are connected to the BBU resource pool 30 by using the fiber backhaul network 20. In the C-RAN network architecture, an RRU 10 has only a radio frequency unit, which is configured to complete transmission and receiving of uplink and downlink radio frequency signals between the UE 40 and the BBU resource pool 30. A signal sent or received by each RRU 10 is processed by a BBU 31 that is in the BBU resource pool 30 and that corresponds to the RRU 10.

In this embodiment of the present invention, a dynamic networking method may be deployed in the BBU resource pool 30 in an integrated manner. The BBU resource pool 30 decomposes a large-scale communications service network into a plurality of subnets based on a network association relationship between an RRU 10 and UE 40, so that each BBU 31 needs to control and manage only RRUs 10 in one or more subnets. By using the solution in this embodiment of the present invention, dynamic configuration of an RRU 10 managed by a BBU 31 is implemented. In addition, after each configuration is complete, there is a specific quantity of RRUs 10 in a subnet managed by each BBU 31, so that coordinated multipoint signal processing occurs only inside each subnet. Compared with an existing RRU full cooperation manner, this can greatly reduce complexity of coordination in a subnet, thereby greatly improving overall network performance.

Alternatively, the networking method in this embodiment of the present invention may be deployed independently in a networking apparatus, and the networking apparatus implements dynamic configuration of an RRU 10 managed by a BBU 31 in the BBU resource pool 30.

Figure 2:
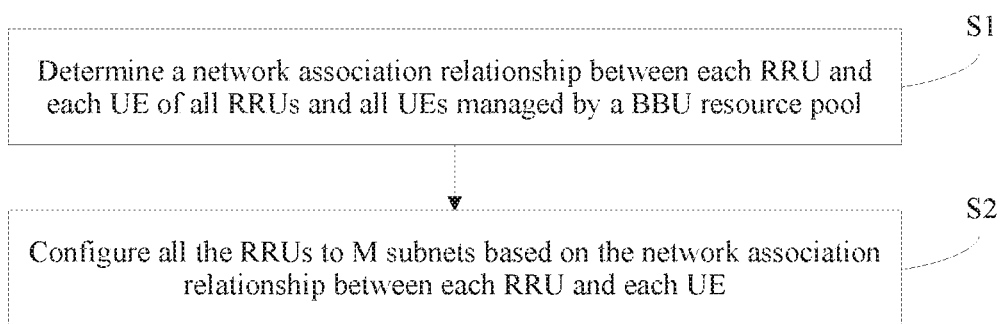
FIG. 2 is a schematic flowchart of a networking method according to an embodiment of the present invention.

FIG. 2 is a schematic flowchart of a networking method according to an embodiment of the present invention. As shown in FIG. 2, the networking method may include the following steps.

Step S1: Determine a network association relationship between each RRU and each UE of all RRUs and all UEs managed by a BBU resource pool.

The network association relationship includes whether the RRU is capable of providing a service for the UE, or reference signal received power that corresponds to each RRU and that is reported by UE is used to represent a relationship between the UE and the RRU.

In this embodiment of the present invention, whether the RRU is capable of providing a service for the UE indicates whether the UE is located in a network coverage area corresponding to the RRU, that is, whether the UE can receive a reference signal of the RRU. The reference signal may be a channel state information-reference signal (Channel State Information Reference Signals, CSI-RS) or another reference signal that can identify that the UE is located in the network coverage area of the RRU.

When accessing a network, UE measures received power of a reference signal that corresponds to each RRU and that is received by the UE, and periodically feeds back a measurement result to a corresponding BBU by using an air interface. The reference signal received power, for example, RSRP, reported by the UE is one of key parameters that can represent strength of a radio signal. Therefore, the reference signal received power reported by the UE may be used to represent a network association relationship between the UE and an RRU. In addition, higher reference signal received power indicates a stronger signal of a corresponding RRU that can be received by the UE, and a higher possibility that the UE accesses a network by using the RRU.

In an optional embodiment of the present invention, the determining a network association relationship between each RRU and each UE of all RRUs and all UEs managed by a BBU resource pool includes:

obtaining a network association relationship between each of all the RRUs and each UE that is managed by each BBU in the BBU resource pool; and determining, based on the network association relationship between each of all the RRUs and each UE that is managed by each BBU in the BBU resource pool, the network association relationship between each RRU and each UE of all the RRUs and all the UEs managed by the BBU resource pool.

In the BBU resource pool, each BBU manages some UEs. Therefore, the network association relationship between each of all the RRUs and each UE that is managed by each BBU may be determined first, and then the network association relationships between all the RRUs and all the UEs in the BBU resource pool are obtained.

In an optional embodiment of the present invention, the determining a network association relationship between each remote radio unit RRU and each user equipment UE of all RRUs and all UEs managed by a baseband processing unit BBU resource pool includes:

obtaining the reference signal received power that corresponds to each RRU and that is measured and reported by each UE; and determining, based on the reference signal received power that corresponds to each RRU and that is measured and reported by each UE, the network association relationship between each RRU and each UE of all the RRUs and all the UEs managed by the BBU resource pool.

It can be learned from the foregoing description that when accessing a network, UE measures received power of a reference signal that corresponds to each RRU and that is received by the UE, and feeds back a measurement result to a corresponding BBU. Therefore, as long as the UE can report, to a BBU to which the UE belongs, the reference signal received power corresponding to each RRU, the UE can receive a reference signal of the RRU, and the RRU is capable of providing a service for the UE.

It should be noted that, in actual application, because signal interference exists in the network, reference signal received power measured by UE may be from an RRU managed by a BBU to which the UE currently belongs, or may be from an RRU managed by another BBU. Therefore, reference signal received power that is received by each BBU and that is reported by UE managed by the BBU includes reference signal received power corresponding to an RRU managed by the BBU, and may further include reference signal received power corresponding to an RRU not managed by the BBU.

In an optional embodiment of the present invention, if the network association relationship is whether the RRU is capable of providing a service for the UE, the determining a network association relationship between each RRU and each UE of all RRUs and all UEs managed by a BBU resource pool includes:

obtaining an identifier of each RRU corresponding to the reference signal received power that is measured and reported by each UE;

determining, based on the identifier of each RRU corresponding to the reference signal received power that is measured and reported by each UE, an RRU that is capable of providing a service for the UEs managed by the BBU resource pool; and determining, based on the RRU that is capable of providing a service for the UEs managed by the BBU resource pool, the network association relationship between each RRU and each UE of all the RRUs and all the UEs managed by the BBU resource pool.

In this embodiment of the present invention, when whether an RRU is capable of providing a service for UE is used to represent a network association relationship between the RRU and the UE, the UE needs to report only the identifier of each RRU corresponding to the reference signal received power measured by the UE, without a need to report the reference signal received power corresponding to each RRU. This reduces resource overheads of the UE, and can also effectively reduce transmission resources occupied by data transmission.

In an optional embodiment of the present invention, the identifier of each RRU corresponding to the reference signal received power that is measured and reported by each UE is an identifier of each RRU corresponding to reference signal received power that is of the reference signal received power measured by the UE and that is greater than a preset power threshold.

In this embodiment of the present invention, UE may report only an identifier of each RRU corresponding to reference signal received power that is greater than the specified power threshold. In this manner, some cases in which the UE obtains reference signal received power through measurement due to inter-cell interference may be excluded, to obtain a more accurate network association relationship between the RRU and the UE.

Step S2: Configure all the RRUs to M subnets based on the network association relationship between each RRU and each UE.

M≥1, and M is not greater than a quantity of all the RRUs.

In this embodiment of the present invention, all the RRUs are configured to several subnets based on the network association relationship between each RRU and each UE in the BBU resource pool, to divide an entire communications service network corresponding to the BBU resource pool. The entire large-scale communications service network is decomposed into a plurality of subnets with a controllable scale, so that each BBU in the BBU resource pool needs to manage only one or more subnets corresponding to the BBU. In this way, network resource allocation and signal processing in the entire communications service network corresponding to the BBU resource pool may be performed on a per-subnet basis. This can greatly reduce complexity of data processing, thereby reducing a network communication latency and improving overall network performance.

In actual application, one subnet should correspond to at least one RRU. Therefore, the quantity M of subnets should not be greater than the total quantity of RRUs.

In an optional embodiment of the present invention, the configuring all the RRUs to M subnets based on the network association relationship between each RRU and each UE includes:

determining a value of M; and configuring all the RRUs to M subnets according to a clustering algorithm and based on the network association relationship between each RRU and each UE.

Clustering is a process of dividing a set of physical or abstract objects into a plurality of categories including similar objects. A cluster generated through clustering is a set of data objects. These objects are similar to an object in the same cluster and are different from an object in another cluster. Therefore, after the quantity M of subnets that need to be obtained through division is determined, all the RRUs and all the UEs may be clustered into M clusters through cluster analysis based on the network association relationships between the RRUs and the UEs. Each cluster corresponds to one subnet, and an RRU in each cluster is an RRU in one subnet.

It can be understood that, in this embodiment of the present invention, a subnet may be understood as a logical cell, and all RRUs configured in a subnet logically belong to a same cell, that is, share a cell. A subnet is also a logical concept, and a network service area of a subnet is a network coverage area of all RRUs configured in the subnet.

In an optional embodiment of the present invention, the configuring all the RRUs to M subnets according to a clustering algorithm and based on the network association relationship between each RRU and each UE includes:

establishing a current relational matrix of the BBU resource pool based on the network association relationship between each RRU and each UE, where a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and clustering, according to the clustering algorithm, RRUs and UEs corresponding to elements in the current relational matrix, and configuring all the RRUs to M subnets based on a clustering result.

The elements in the current relational matrix correspond to the network association relationships between the RRUs and the UEs managed by the BBU resource pool. All the RRUs and all the UEs may be clustered based on the network association relationships between the RRUs and the UEs by performing cluster analysis on the elements in the current relational matrix, thereby configuring all the RRUs to M subnets based on the clustering result.

When the network association relationship is whether the RRU is capable of providing a service for the UE, if the RRU is capable of providing a service for the UE, an element at a corresponding location in the current relational matrix is a nonzero element, for example, may be set to 1 or may be another specified nonzero element; or if the RRU is incapable of providing a service for the UE, the element at the corresponding location in the current relational matrix is 0. When the network association relationship is that the reference signal received power that corresponds to each RRU and that is reported by UE is used to represent an association relationship between the UE and the RRU, an element in the current relational matrix is reference signal received power that is reported by UE corresponding to a location at which the element is located and that corresponds to an RRU corresponding to the location. If UE does not receive a reference signal of an RRU, that is, the UE does not report reference signal received power of the RRU, an element at a corresponding location in the current relational matrix is 0.

For example, a quantity of RRUs managed by the BBU resource pool is 3, and a quantity of UEs is 4. When the network association relationship is whether the RRU can serve the UE, it is assumed that the current relational matrix of the BBU resource pool is:

$$\begin{bmatrix} 1 & 0 & 1 \\ 0 & 1 & 1 \\ 1 & 1 & 0 \\ 1 & 1 & 1 \end{bmatrix}$$

It can be learned that a quantity of rows in the matrix is 4, that is, the quantity of UEs; and a quantity of columns is 3, that is, the quantity of RRUs. An element at the $1^{st}$ row and the $1^{st}$ column is a network association relationship between an RRU corresponding to the $1^{st}$ column and UE corresponding to the 1$^{st}$ row. The element is 1, and this means that the RRU is capable of providing a service for the UE.

In an optional embodiment of the present invention, before the clustering, according to the clustering algorithm, RRUs and UEs corresponding to elements in the current relational matrix, the networking method may further include:

determining, based on the current relational matrix and a relational matrix of a previous moment, that the current relational matrix meets a preset networking update condition.

In an optional embodiment of the present invention, the networking update condition may include:

an L2 norm of a matrix that is obtained by perforating a subtraction operation between the relational matrix of the previous moment and the current relational matrix is greater than a specified threshold.

After networking configuration, performance of the entire network is relatively stable within a specific time. To avoid an unnecessary networking update operation, the networking update condition is set, and networking reconfiguration is performed when the update condition is met. This can effectively save system resources.

It can be understood that, in actual application, a networking operation may be configured to be updated based on a preset update period. The previous moment is a moment that is one update period away from the current moment.

An L2 norm of a difference between two matrices is a value of a Frobenius (Frobenius) norm, and may be used to represent a magnitude of the difference between the two matrices, where a smaller value of the L2 norm indicates a smaller difference. Therefore, an L2 norm of a difference between the current relational matrix and the relational matrix of the previous moment may be used to evaluate whether a quantity of UEs in a current network or network association relationships between UEs and RRUs are relatively greatly changed, that is, whether a network is stable after previous networking configuration, thereby determining whether re-subnetting is required. A smaller value of the L2 norm indicates a more stable network after the previous configuration, and indicates that the quantity of UEs or the network association relationships between UEs and RRUs are slightly changed. Therefore, when the L2 norm of the matrix that is obtained by performing a subtraction operation between the relational matrix of the previous moment and the current relational matrix is less than or equal to the specified threshold, networking reconfiguration may be not required, and a subsequent networking process may be continued only when the L2 norm of the matrix that is obtained by performing a subtraction operation between the relational matrix of the previous moment and the current relational matrix is greater than the specified threshold.

The specified threshold may be determined based on an empirical value or may be obtained through experiments.

In an optional embodiment of the present invention, the establishing a current relational matrix of the BBU resource pool based on the network association relationship between each RRU and each UE may include:

establishing a relational submatrix of each BBU based on the network association relationship between each of all the RRUs and each UE that is managed by each BBU in the BBU resource pool; and establishing the current relational matrix of the BBU resource pool based on the relational submatrix of each BBU.

It can be learned from foregoing descriptions that each BBU in the BBU resource pool manages some RRUs and some UEs. Therefore, to reduce complexity of data processing, after the network association relationship between each RRU and each UE that is managed by each BBU is determined, the relational submatrix of each BBU may be established first, and then the current relational matrix of the entire BBU resource pool is obtained based on the relational submatrix of each BBU. A quantity of rows in a relational submatrix is equal to the quantity of rows in the current relational matrix, and a quantity of columns in the relational submatrix is equal to the quantity of columns in the current relational matrix. However, in the relational submatrix, elements in all rows except a row in which UE managed by a BBU corresponding to the relational submatrix is located are 0s. In other words, no network association relationship exists between an RRU and UE.

In an optional embodiment of the present invention, the establishing the current relational matrix of the BBU resource pool based on the relational submatrix of each BBU includes: performing addition on the relational submatrices of the BBUs to establish the current relational matrix of the BBU resource pool.

In this embodiment of the present invention, it is denoted that a quantity of BBUs in the BBU resource pool is N, where N≥2. $W_1, W_2, \ldots,$ and $W_N$ respectively represent a current relational submatrix of the 1$^{st}$ BBU, a current relational submatrix of the 2$^{nd}$ BBU, ..., and a current relational submatrix of the N$^{th}$ BBU; and W represents the current relational matrix of the BBU resource pool. Then, $$W = W_1 + W_2 + \ldots + W_N \qquad (1)$$

For a network that includes K UEs and L RRUs, W is a matrix having K rows and L columns. An element $w_{kl}$ in the k$^{th}$ row and the l$^{th}$ column of W represents a network association relationship between the k$^{th}$ UE and the l$^{th}$ RRU. The element $w_{kl}$ has different physical meanings in different application scenarios. In networking implementation based on reference signal received power, $w_{kl}$ is reference signal received power that corresponds to the l$^{th}$ RRU and that is measured by the k$^{th}$ UE. In networking based on whether an RRU is capable of providing a service for UE, $w_{kl}$ indicates whether the l$^{th}$ RRU is capable of providing a service for the k$^{th}$ UE. For example, $w_{kl}$ equal to 1 may be used to indicate that the k$^{th}$ UE is served by the l$^{th}$ RRU, and $w_{kl}$ equal to 0 may be used to indicate that the k$^{th}$ UE is not served by the l$^{th}$ RRU.

It can be understood that performing addition on the relational submatrices of the BBUs to establish the current relational matrix of the BBU resource pool is just one manner of establishing the current relational matrix. In actual application, some processing, for example, normalization processing, may be further performed on the relational submatrices as required. Then the current relational matrix of the BB U resource pool is established based on processed relational submatrices of the BBUs.

In an optional embodiment of the present invention, the clustering, according to the clustering algorithm, RRUs and UEs corresponding to elements in the current relational matrix, and configuring all the RRUs to M subnets based on a clustering result may include:

calculating a Laplacian matrix of the current relational matrix and all eigenvectors of the Laplacian matrix;

sorting all the eigenvectors in ascending order of eigenvalues corresponding to the eigenvectors, and constructing an eigenmatrix by using each of first M eigenvectors obtained after the ascending sorting as one column;

rotating subspace corresponding to the eigenmatrix, to obtain a subnet matrix that corresponds to the eigenmatrix and that has only one nonzero element in each row, where each column in the subnet matrix corresponds to one subnet, and the nonzero element in each column is an RRU and UE of a subnet corresponding to the column; and configuring the RRU of each subnet to the corresponding subnet.

A network association relationship between an RRU and UE in the current relational matrix may be considered as a similarity between the RRU and the UE. Therefore, an element clustering problem in the current relational matrix may be resolved based on a similarity graph theory. In a clustering manner based on a graph theory, essentially, a clustering problem is converted into a problem of how to optimally divide a graph. A Laplacian matrix of sample data is clustered, to cluster the sample data. The cluster analysis solution in this embodiment of the present invention is a new clustering manner provided based on an actual application scenario of this embodiment of the present invention in combination with a clustering theory in the graph theory.

In the clustering manner of this embodiment of the present invention, all the RRUs and all the UEs corresponding to the elements in the current relational matrix are used as objects to be clustered and divided. An adjacency matrix of the current relational matrix and a degree matrix corresponding to the adjacency matrix need to be calculated first, and the Laplacian matrix of the current relational matrix is obtained through calculation based on the adjacency matrix and the degree matrix. A quantity of rows and a quantity of columns in the Laplacian matrix are both a total quantity of all the RRUs and all the UEs managed by the BBU resource pool.

Then, first M eigenvectors with smallest corresponding eigenvalues are selected based on all the eigenvalues of the Laplacian matrix, to construct the eigenmatrix. The eigenmatrix is constructed by using the eigenvectors. Therefore, the eigenmatrix can be used to represent the current relational matrix, and a quantity of rows in the eigenmatrix is the quantity of rows in the current relational matrix. To determine a subnet in which each RRU is located and a subnet in which each UE is located, in this embodiment of the present invention, the subspace corresponding to the eigenmatrix is rotated, to obtain the subnet matrix that corresponds to the eigenmatrix and that has only one nonzero element in each row. The subnet matrix corresponds to the eigenmatrix. A quantity of columns in the subnet matrix is still M, a quantity of rows in the subnet matrix is the total quantity of all the RRUs and all the UEs, and a nonzero element in each row corresponds to one RRU or one UE. Therefore, an RRU and UE of each subnet are determined in this manner, thereby configuring all the RRUs to corresponding subnets based on a result of the determining.

In an optional embodiment of the present invention, the rotating subspace corresponding to the eigenmatrix includes: rotating the subspace corresponding to the eigenmatrix by a minimum distance.

The rotating the subspace corresponding to the eigenmatrix by a minimum distance means that spatial rotation is performed in a state in which a minimum change is made to an energy function of the subspace, to minimize a difference between the subnet matrix that is obtained after the rotation and the eigenmatrix, thereby minimizing impact of the spatial rotation on a network configuration result. In this way, a subnet configuration solution that is based on the subnet matrix is a closest approximation of a network association relationship between an RRU and UE in an actual network. The minimum change to the energy function of the subspace results in a minimum value of an L2 norm of a difference between orthogonal projection operators of the subspace before the rotation and subspace after the rotation.

In an optional embodiment of the present invention, the determining a value of M includes: determining, as the value of M based on a value range of M, a maximum value that is within the value range and that meets a preset subnetting rule, where the subnetting rule includes:

a reciprocal of a sum of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

It can be learned from the foregoing descriptions that the value range of M is M≥1, and M is not greater than the total quantity of all the RRUs.

In a categorization manner based on cluster analysis, a most difficult problem is how to determine a quantity of cluster categories. In this embodiment of the present invention, how to divide the entire large-scale service network corresponding to the BBU resource pool into as many subnets as possible that have controllable scales and that meet an actual application requirement is a key problem to be resolved by the dynamic networking method according to this embodiment of the present invention. In a communications network, a communication effect of UE, especially edge UE, is mainly affected by inter-network interference (inter-cell interference). In this embodiment of the present invention, an interference threshold is set, so that interference in an entire network after subnetting is controlled within the threshold, thereby ensuring overall network performance.

If an RRU and UE belong to a same subnet, an element that is in the current relational matrix and that corresponds to the RRU and the UE may be used to represent strength of a communication signal received by the UE. If an RRU and UE do not belong to a same subnet, an element that is in the current relational matrix and that corresponds to the RRU and the UE may be used to represent strength of an interference signal received by the UE. Therefore, for each subnet obtained through division, the foregoing ratio may be used to represent a signal-to-interference ratio in the subnet. The reciprocal of the sum of the signal-to-interference ratios of all the subnets may be used as an indicator for measuring interference between all the subnets after the entire service network is divided into M subnets.

In an optional embodiment of the present invention, the Laplacian matrix is a random walk Laplacian matrix.

In a conventional clustering algorithm, an objective is to perform unsupervised learning on a to-be-clustered object, and there is no absolutely objective criterion for measuring a clustering effect of a clustering result. A criterion for finally determining an effect is how close the clustering result is to human judgment. Therefore, the clustering result is not objective enough.

In this embodiment of the present invention, the subnetting rule is that the reciprocal of the sum of the signal-to-interference ratios of all the subnets is not greater than the preset threshold. In other words, a subnetting criterion is an inter-subnet interference-to-signal ratio. This is an objective criterion. When the ratio is used as a target function (judgment criterion) for subnetting to perform subnet clustering and division, a mathematical form of the ratio meets a form of the random walk Laplacian matrix. The current relational matrix is processed in a clustering manner that is based on the random walk Laplacian matrix, and a final value of M that can be obtained meets an actual objective criterion, rather than approximating a subjective criterion of human judgment. The final value of M obtained in this manner minimizes interference of the entire network, that is, the reciprocal of the sum of the signal-to-interference ratios of all the subnets.

In an optional embodiment of the present invention, to rapidly determine a final value of M that meets the subnetting rule, the maximum value is a maximum numerical value that is found in the value range by using a binary search method and that meets the subnetting rule.

Figure 3:
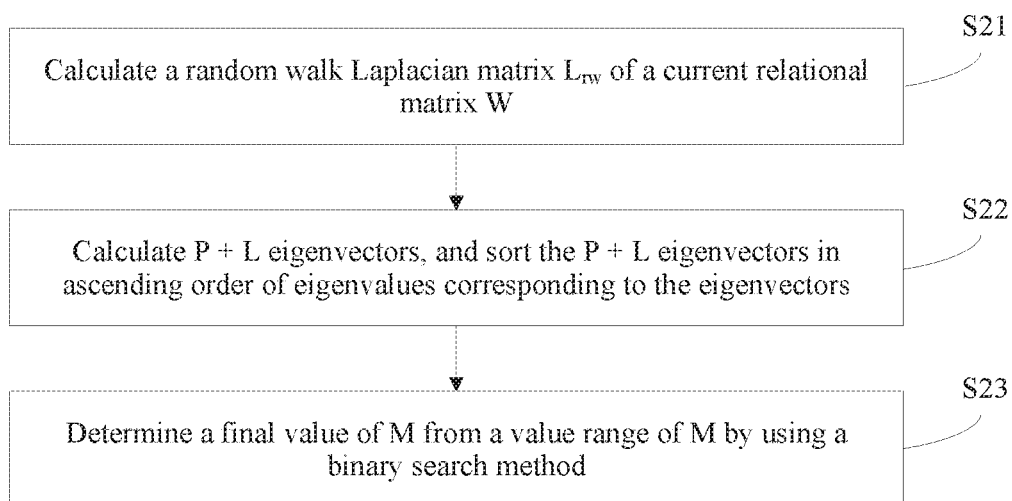
FIG. 3 is a schematic flowchart of determining a final value of M according to an embodiment of the present invention.
Figure 4:
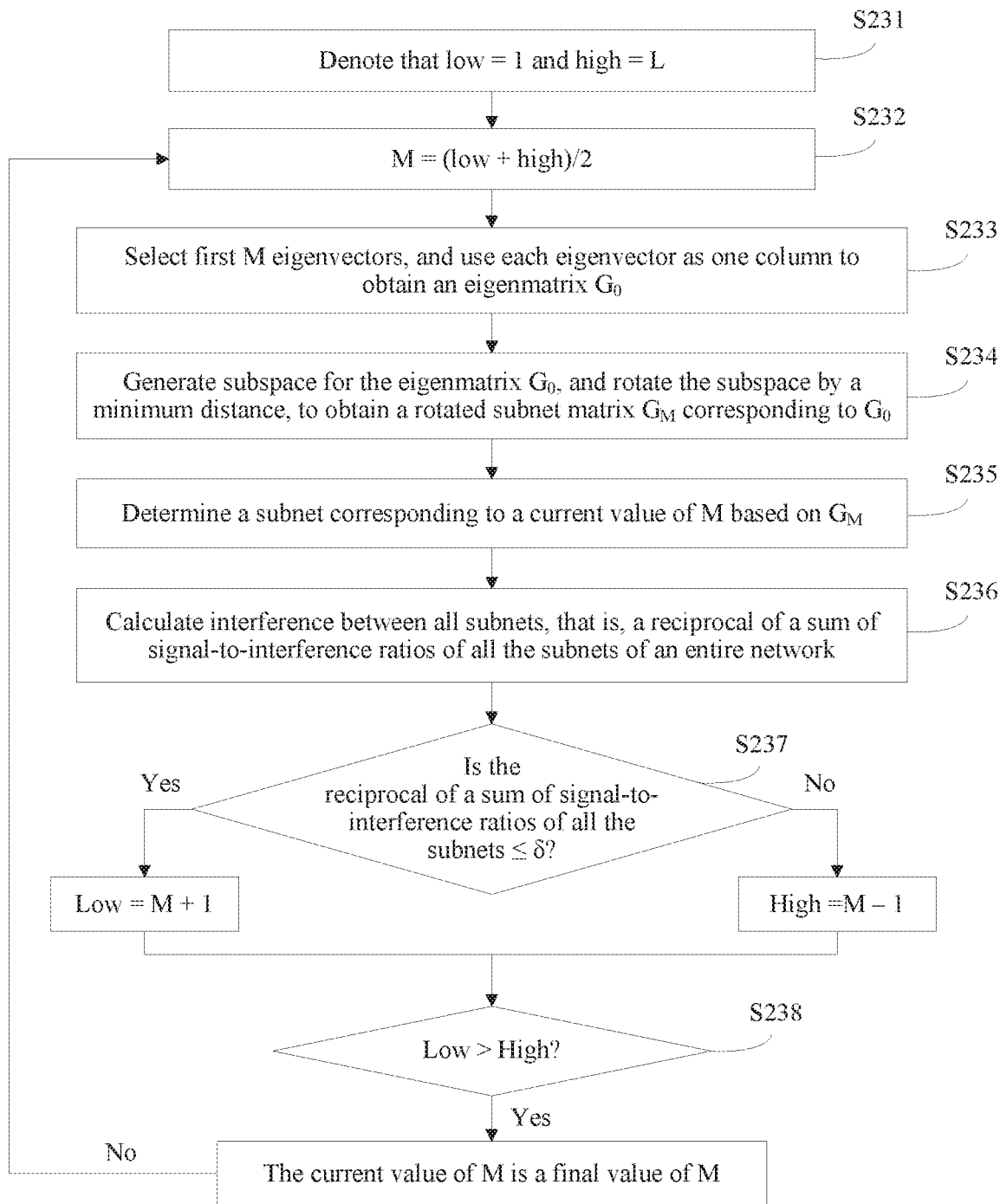
FIG. 4 is a schematic flowchart of determining a final value of M from a value range of M by using a binary search method according to an embodiment of the present invention.

FIG. 3 is a schematic flowchart of determining a final value of M according to a specific embodiment of the present invention. It can be learned from the figure that, in this specific embodiment, determining the final value of M may include the following steps.

Step S21: Calculate the random walk Laplacian matrix $L_{rw}$, of the current relational matrix W.

In this specific embodiment, a formula for calculating the random walk Laplacian matrix $L_{rw}$ is as follows:

$$A = \begin{bmatrix} O & W \\ W^T & O \end{bmatrix} \quad (2)$$

$$L_{rw} = I - D^{-1}A \quad (3)$$

In the formula, A represents an adjacency matrix of W, $W^T$ represents a transposed matrix of W, I represents an identity matrix, D represents a degree matrix of A, all elements in D except a diagonal element are 0, and $D^{-1}$ represents an inverse matrix of the matrix D. A formula for calculating the diagonal element in the degree matrix D is as follows:

$$d_i = \Sigma_{j=1}^{K+L} a_{ij} \quad (4)$$

In the formula, K represents the quantity of all the UEs, L represents the quantity of all the RRUs, $d_i$ represents a diagonal element in the $i^{th}$ row in D, and $a_{ij}$ represents an element in the $i^{th}$ row and the $j^{th}$ column in A.

Step S22: Calculate P+L eigenvectors of $L_{rw}$ and sort the P+L eigenvectors in ascending order of eigenvalues corresponding to the eigenvectors, where the P+L eigenvectors after the sorting are respectively denoted as $P_1, P_2, \ldots,$ and $P_{K+L}$.

Step S23: Determine the final value of M from the value range of M by using the binary search method.

The value range of M is [1, L].

In this specific embodiment, the determining the final value of M by using the binary search method specifically includes the following steps.

Step S231: Denote that low=1 and high=L during initialization.

Step S232: M=(low+high)/2, where if a value of M is not an integer, the value is rounded up.

Step S233: Select first M eigenvectors $P_1, P_2, \ldots,$ and $P_M$, and use each eigenvector as one column to obtain an eigenmatrix $G0=(P_1, P_2, \ldots,$ and $P_M)$.

Step S234: Generate subspace for the eigenmatrix $G_0$, and rotate the subspace by a minimum distance, to obtain a rotated subnet matrix $G_M=(C_1, C_2, \ldots, C_M)$ corresponding to $G_0$, where each row of $G_M$ has only one nonzero element.

Step S235: Determine a subnet corresponding to a current value of M based on $G_M$.

Each column in $G_M$ corresponds to one subnet, and all nonzero elements in each column are RRUs and UEs in the subnet corresponding to the column. In this specific embodiment, for ease of description, $C_j$ is directly used to represent a subnet corresponding to the $j^{th}$ column, and UEs and RRUs corresponding to all nonzero elements in the $j^{th}$ column are RRUs and UEs corresponding to the subnet $C_j$.

Step S236: Calculate interference between all subnets, that is, the reciprocal of the sum of the signal-to-interference ratios of all the subnets of the entire network. A calculation formula is as follows:

$$\Sigma_{j=1}^M \text{int}(C_j)/\text{sig}(C_j) \quad (5)$$

In the formula:

$$\text{sig}(C_j) = \Sigma_{u_k, b_l \in C_j} w_{kl} \quad (6)$$

$$\text{int}(C_j) = \Sigma_{u_k \in C_j, b_l \notin C_j} w_{kl} + \Sigma_{u_k \notin C_j, b_l \in C_j} w_{kl} \quad (7)$$

In the formula (6) $u_k, b_l \in C_j$ represents that the $k^{th}$ UE and the $l^{th}$ RRU both belong to the subnet $C_j$, $u_k \in C_j$, $b_l \notin C_j$ represents that the $k^{th}$ UE belongs to $C_j$ and the $l^{th}$ RRU does not belong to $C_j$, $u_k \notin C_j$, $b_l \in C_j$ represents that the $k^{th}$ UE does not belong to $C_j$ and the $l^{th}$ RRU belongs to $C_j$, and $w_{kl}$ represents a network association relationship between the $k^{th}$ UE and the $l^{th}$ RRU in the current relational matrix, that is, an element at a corresponding location in the current relational matrix W.

Step S237: Determine whether a subnetting result meets the subnetting rule, that is, determine whether a reciprocal of the signal-to-interference ratios of all the subnets is less than or equal to a threshold δ, that is, whether a formula (8) for determining is valid. If the formula (8) is valid, perform an update so that low=M−1; or if the formula (8) is invalid, perform an update so that high=M−1. The formula for determining is as follows:

$$\sum_{j=1}^{M} \frac{\text{int}(C_j)}{\text{sig}(C_j)} \leq \delta \quad (8)$$

Step S238: Determine whether low>high is met. If low>high is met, use the current value of M as the final value of M; or if low>high is not met, go back to step S232.

It can be learned from this specific embodiment that a subnet matrix corresponding to the final value of M is a subnet matrix used when cluster analysis is performed on the elements in the current relational matrix by using the final value of M as the quantity of clusters. Correspondingly, all nonzero elements in each column in the subnet matrix corresponding to the final value of M are RRUs and UEs in a subnet corresponding to the column. Therefore, in actual application, RRUs and UEs in each of the M subnets are also determined while the final value of M is determined. To be specific, in the subnet matrix $(C_1, C_2, \ldots, C_M)$ corresponding to the final value of M, the nonzero elements in each column are the RRUs and the UEs in the subnet corresponding to the column, thereby obtaining the RRUs of each subnet.

It can be understood that implementation steps of the networking method in this embodiment of the present invention are not fixed, and may be adjusted or performed alternately based on a requirement of actual implementation. For example, an RRU configuration result of each subnet may also be obtained while the final value of M is determined.

In an optional embodiment of the present invention, after the configuring all the RRUs to M subnets based on the network association relationship between each RRU and each UE, the method further includes:

mapping an RRU of each subnet to a BBU in the BBU resource pool based on an RRU configuration result of the M subnets, so that the BBU performs networking configuration for the RRU of the corresponding subnet based on a mapping result, where one subnet corresponds to at least one BBU.

In this embodiment of the present invention, after the RRU configuration of each subnet is complete, the BBU in the BBU resource pool may be configured accordingly based on a subnet configuration result.

In an optional embodiment of the present invention, the mapping an RRU of each subnet to a BBU in the BBU resource pool includes:

if M is not greater than the quantity of BBUs in the BBU resource pool, mapping the RRU of each subnet to at least one BBU.

In an optional embodiment of the present invention, the mapping an RRU of each subnet to a BBU in the BBU resource pool includes: if M is greater than a quantity of BBUs in the BBU resource pool, mapping an RRU of each subnet to a BBU in the BBU resource pool based on a quantity of RRUs in each subnet, where after the mapping, a difference between a maximum value of corresponding RRU quantities of the BBUs and a minimum value of the corresponding RRU quantities of the BBUs is less than a specified value.

A quantity of UEs in the entire network is variable. Therefore, a quantity of subnets after each networking division may be different. M may be greater than the quantity of BBUs in the BBU resource pool, or M may be not greater than the quantity of BBUs in the BBU resource pool. When M is not greater than the quantity of BBUs in the BBU resource pool, each subnet may be mapped to at least one BBU. In this case, in actual application, whether one subnet is mapped to one BBU or mapped to more than one BBU may be determined based on an actual application scenario. For example, if there is a relatively small quantity of UEs in the service network corresponding to the BBU resource pool. (where the quantity of UEs is less than a specified threshold), one subnet may be mapped to one BBU, without a need to put all the BBUs into use, thereby saving BBU resources.

When M is greater than the quantity of BBUs in the BBU resource pool, one BBU is mapped to at least one subnet. In addition, to balance network configuration as much as possible, after the subnet configuration, the RRU of each subnet is mapped to a BBU in the resource pool based on the quantity of RRUs in the subnet, so that quantities of RRUs managed by the BBUs are relatively balanced. To be specific, a difference between a quantity of RRUs managed by a BBU that manages most RRUs and a quantity of RRUs managed by a BBU that manages least RRUs is less than the specified value.

In this embodiment of the present invention, after the RRU of each subnet is mapped to a BBU in the BBU resource pool, the entire service network is divided into M relatively independent subnets, which may be understood as M logical cells. The BBU of each subnet serves only the RRU in the corresponding subnet, and the RRU in each subnet provides a service only for UE in a coverage area of the corresponding subnet.

In this embodiment of the present invention, after a subnet is mapped to a BBU, the BBU can perform, based on a configuration result, networking configuration for an RRU corresponding to the BBU. Then the BBU may allocate a pilot sequence to the RRU in the subnet corresponding to the BBU and start a channel estimation process. After the pilot sequence is configured for the RRU, UE may measure a channel quality indicator (Channel Quality Indicator, CQI) of the RRU by using a pilot signal, determine a precoding matrix indicator (Precoding Matrix Indicator, PMI), and report the CQI and the PMI to the corresponding BBU. Then the BBU can perform corresponding baseband signal processing and air interface resource allocation in a current networking form, to implement radio access of the UE.

The networking method according to this embodiment of the present invention may be deployed in the BBU resource pool and performed by a processor in the BBU resource pool, or may be deployed in a separate networking apparatus and may be specifically performed by a data processing device or a processor. In this embodiment of the present invention, a large-scale mobile communications network is decomposed into as many subnets as possible with similar scales. Each RRU may receive or send only a signal between UE in the subnet in which the RRU is located and a BBU. The scales of the subnets are controllable. Therefore, a problem of difficult hardware implementation in an existing RRU full cooperation solution can be resolved. In addition, each BBU controls and manages RRUs in only one or several subnets. Coordinated signal processing by RRUs in each subnet may occur only inside the subnet under control. Therefore, complexity of resource allocation and signal processing in the subnet is greatly reduced, greatly reducing computing overheads. More importantly, a BBU manages only an RRU in a subnet corresponding to the BBU. Therefore, a plurality of BBUs may perform related computing such as resource configuration and signal processing on RRUs in corresponding subnets of the BBUs in parallel. For example, the plurality of BBUs may calculate global precoding matrices of UEs in coverage areas of corresponding subnets of the BBUs in parallel. This can effectively reduce a computing latency in resource allocation and signal processing, improve a network capacity, and reduce a communication latency, thereby better meeting a real-time requirement of communication. Moreover, in this embodiment of the present invention, a problem concerning inter-subnet interference suppression is further fully considered in subnet decomposition. The interference threshold is set, and inter-subnet interference needs to be less than the given threshold. This effectively reduces subnet interference and improves overall network performance.

Figure 5:
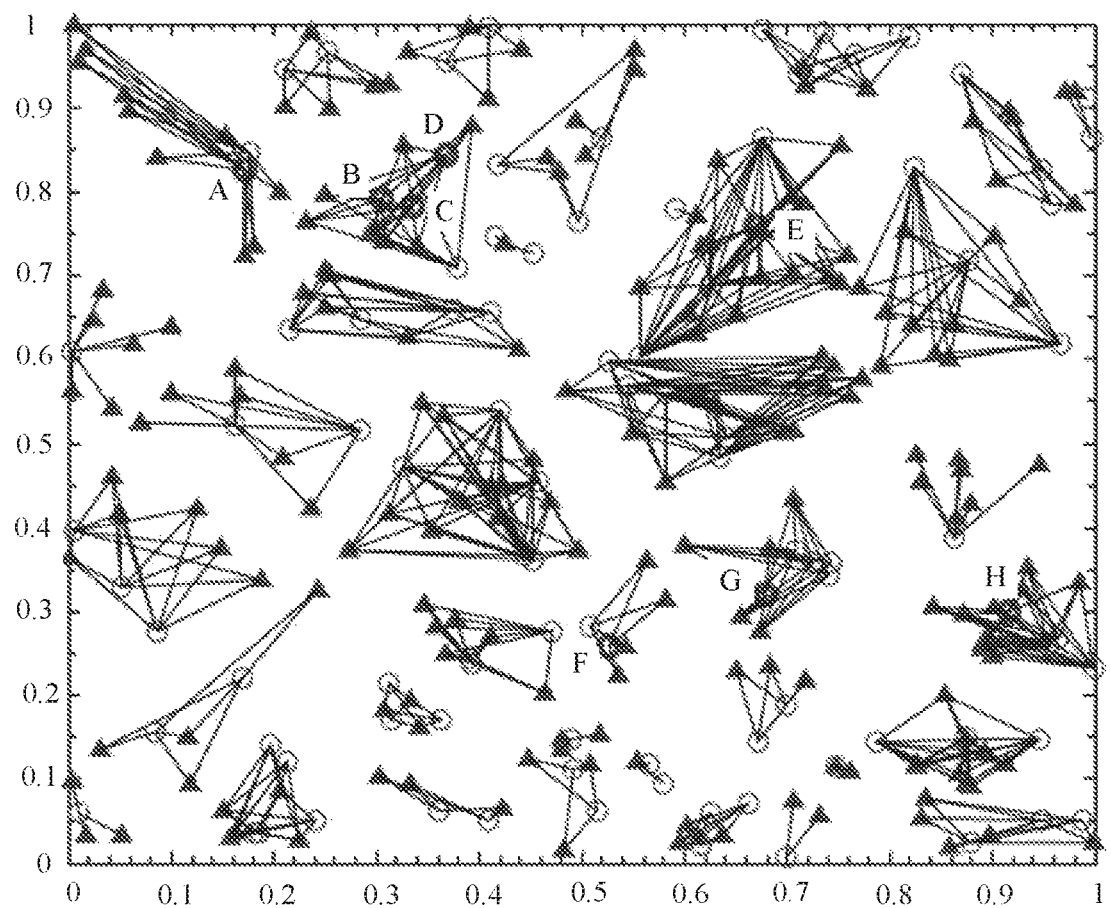
FIG. 5 is a schematic diagram of a networking connection relationship according to an embodiment of the present invention.
Figure 6:
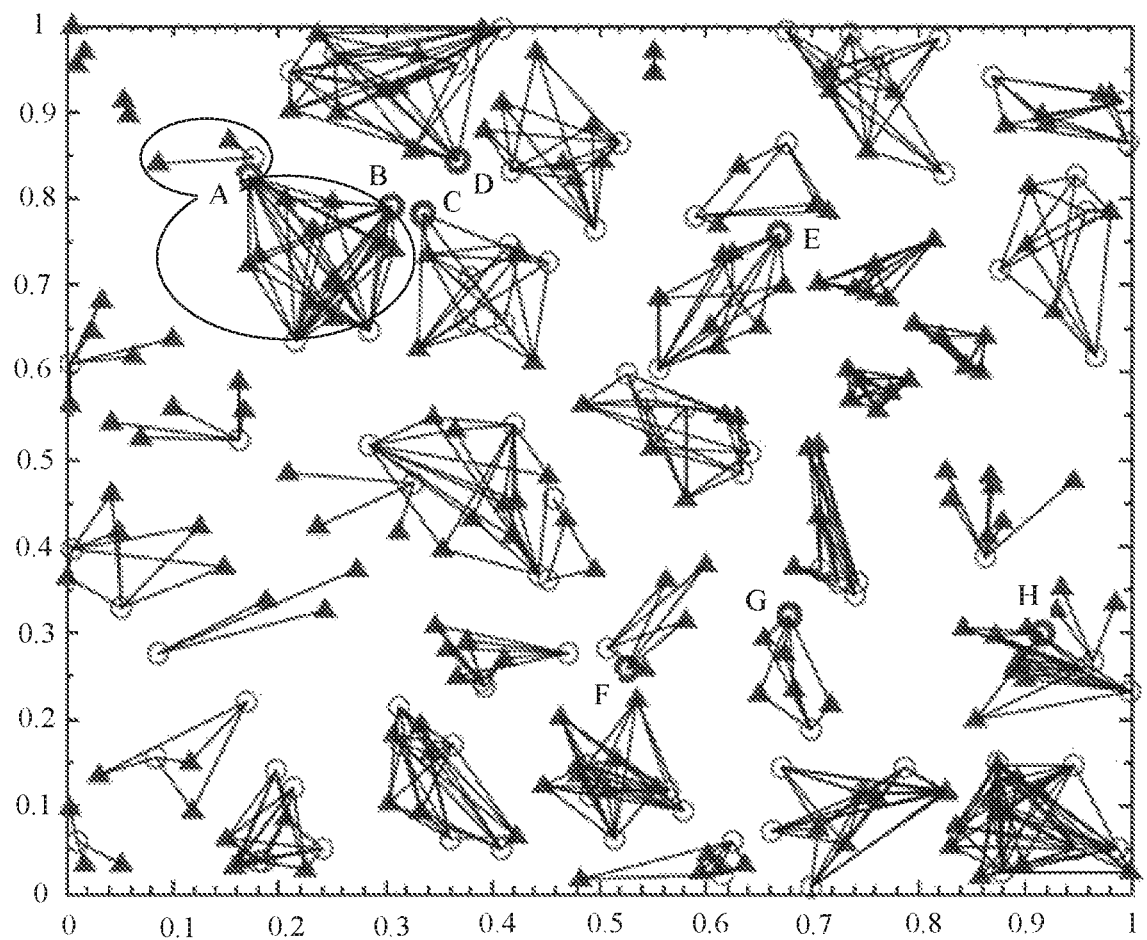
FIG. 6 is a schematic diagram of a networking connection relationship in an existing LTE standard.
Figure 7:
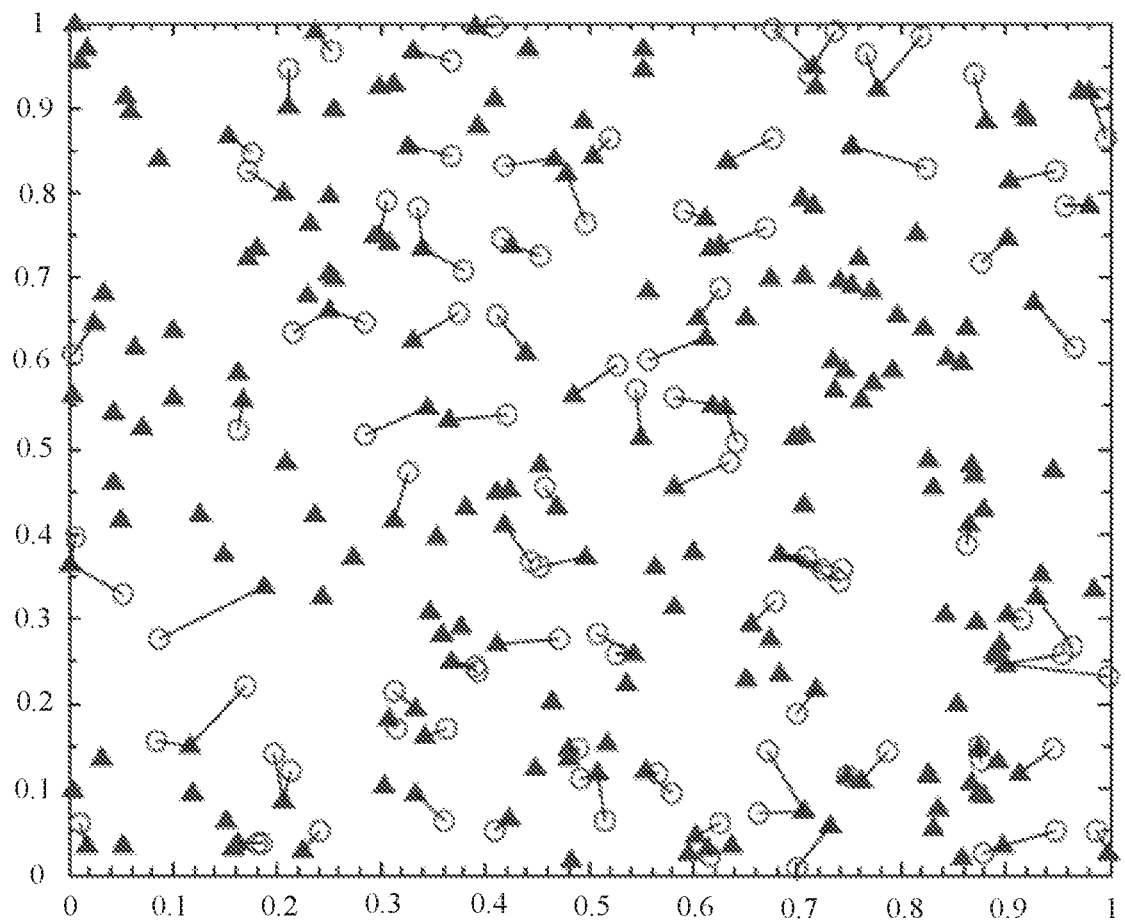
FIG. 7 is a schematic diagram of a networking connection relationship in a cellular network.

FIG. 5 is a schematic diagram of a networking result obtained by performing a simulation test on the networking method according to the embodiments of the present invention by using a computer simulation platform in a specific embodiment of the present invention. FIG. 6 is a schematic diagram of a networking result based on a CoMP technology in the existing LTE standard under a same simulation condition. FIG. 7 is a schematic diagram of a networking result corresponding to a cellular network under a same simulation condition. During tests, an area of an entire service network is normalized into a square with a side length of 1. In other words, the side lengths of the squares in FIG. 5 to FIG. 7 are 1. L=200 RRUs and K=100 UEs are generated randomly. In the figures, a triangle represents an RRU, a circle represents UE, and a line between the triangle and the line represents a service relationship between the RRU and the UE.

In the cellular network, one RRU is one RRU service set. UE selects and accesses an RRU corresponding to highest receive power of reference signal received power measured by the UE. As shown in FIG. 7, each UE has a connection relationship with only one RRU. In FIG. 5 and FIG. 6, each mesh or star-shaped connection topology including a plurality of RRUs represents one RRU service set (one logical cell). All the RRUs in the RRU service set are managed by a same BBU. For example, two ellipses in FIG. 6 indicate two RRU service sets.

In FIG. 7, one RRU is one RRU service set. Therefore, each UE receives severe interference from other RRUs. In FIG. 6, A to H denote eight UEs that encounter strong interference from edge cells. For example, A is prone to receive signal interference from an RRU service set on a left side of A. It can be learned from the networking result shown in FIG. 5 that because RRU configuration in each subnet is fixed and an RRU service set of each subnet provides a service only for UE in a coverage area of the same subnet, there is a relatively small possibility that the UE encounters interference from another RRU service set. As shown in FIG. 5, there is a relatively small possibility that the UEs denoted by A to H (where locations of A to H in FIG. 5 correspond to locations of A to H in FIG. 6, and the sign E in FIG. 5 is covered by a networking connection relationship and therefore is not shown) encounter interference from RRU service sets adjacent to the UEs. In comparison with the networking results in FIG. 6 and FIG. 7, interference is greatly reduced.

Figure 8:
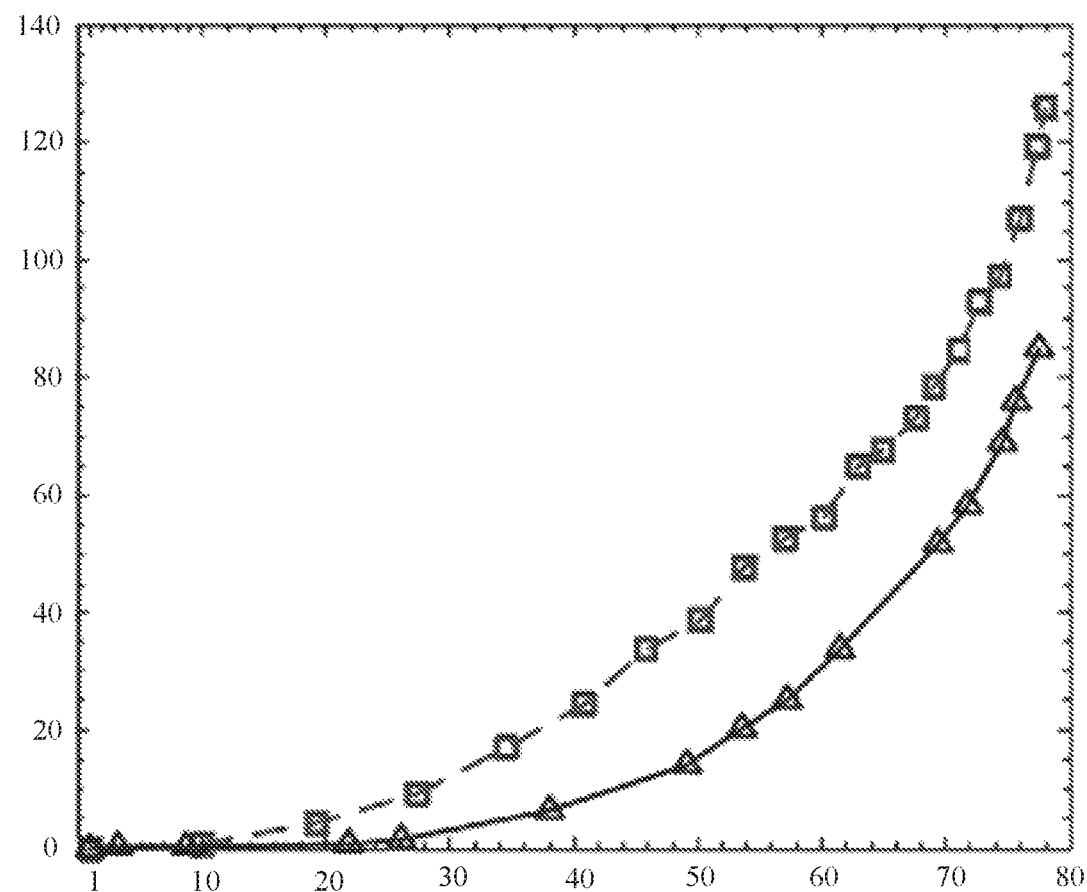
FIG. 8 is a schematic diagram of comparison between networking performance in an embodiment of the present invention and networking performance in an LTE standard according to an embodiment of the present invention.
Figure 9:
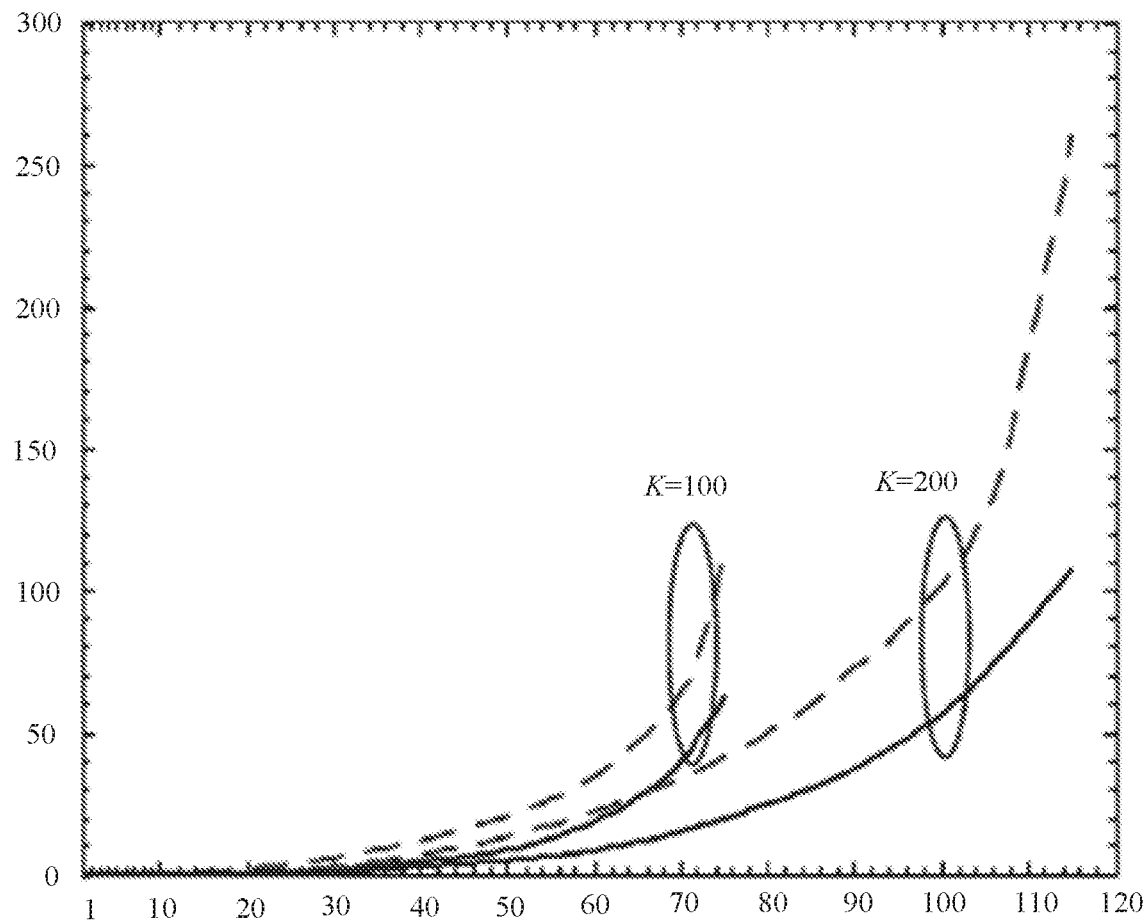
FIG. 9 is a schematic diagram of comparison between networking performance in an embodiment of the present invention and networking performance in an LTE standard according to another embodiment of the present invention.

FIG. 8 and FIG. 9 each are a schematic diagram of performance comparison between a networking result in a specific embodiment of the present invention and a networking result based on a CAW technology in the existing LTE standard in two application scenarios. In this specific embodiment, the sum of interference between different subnets calculated by using the formula (5) in this embodiment of the present invention is used as a performance indicator. A smaller calculation result indicates a smaller sum of inter-subnet interference and better networking performance. In FIG. 8 and FIG. 9, a horizontal axis represents a quantity of subnets, that is, a quantity of RRU service sets, and a vertical axis represents a sum of subnet interference.

FIG. 8 shows performance curves of two networking results when RRU and UE distribution is given. An upper curve represents an interference curve corresponding to the CoMP technology, and a lower curve represents an interference curve corresponding to the networking result of this embodiment of the present invention. It can be learned by comparing the two curves that when quantities of subnets are the same, the networking method according to the embodiments of the present invention can effectively reduce the sum of inter-subnet interference. In addition, for the interference curve corresponding to the CoMP technology, if there is only one RRU in each RRU service set, the CoMP technology is degraded into the cellular network. Experimental results indicate that the cellular network has strongest interference and poorest performance.

FIG. 9 is a schematic diagram of performance comparison between a networking result in an embodiment of the present invention and a networking result of a CoMP technology when a large quantity of RRU and UE distribution samples are generated through simulation tests. In the figure, a curve (an upper curve) represented by a broken line corresponds to the CoMP technology, and a continuous curve (a lower curve) corresponds to this embodiment of the present invention. Two curves indicated by an ellipse on the left in the figure are performance curves when a quantity of UEs K=100, and two curves indicated by an ellipse on the right in the figure are performance curves when the quantity of UEs K=200. It can be learned from FIG. 9 that, compared with the CoMP technology, the networking method according to the embodiments of the present invention achieves a quite obvious performance gain, in other words, interference is greatly reduced. In addition, a performance gain of the networking method according to the embodiments of the present invention becomes more obvious as the quantity of UEs increases. It can be learned by comparing the curves when K=200 that inter-cell interference of the networking method of the embodiments of the present invention is only approximately 50% that of the CoMP technology.

It can be learned from the comparison results in FIG. 5 to FIG. 7, FIG. 8, and FIG. 9, in comparison with the cellular network and the CoMP technology in the LTE standard, the networking method according to the embodiments of the present invention achieves an obvious performance gain, and interference in a network is significantly reduced. This can greatly improve overall network performance and improve user experience.

In the networking method according to the embodiments of the present invention, all the RRUs are configured to different subnets, and an RRU in each subnet corresponds to a BBU of the subnet. Therefore, an RRU service set in each subnet is fixed. To be specific, for RRUs configured to the subnets based on the networking method according to the embodiments of the present invention, each RRU needs to provide a service only for UE in a coverage area of a subnet corresponding to the RRU. The networking method according to the embodiments of the present invention is different from an existing networking mode, and pilot sequence allocation results are also different. Therefore, whether the networking method according to the embodiments of the present invention is implemented may be determined by measuring a pilot sequence configuration on an air interface.

An embodiment of the present invention further provides a networking method. The networking method may be performed by a BBU in a BBU resource pool. The method may include:

receiving, by the BBU, an RRU configuration result of a subnet, where the RRU configuration result is determined based on a network association relationship between each RRU and each UE of all RRUs and all UEs managed by the BBU resource pool, the RRU configuration result includes an RRU service set that needs to be managed by the BBU, and the network association relationship includes whether the RRU is capable of providing a service for the UE, or average receive power of the RRU reported by the UE is used to represent a relationship between the RRU and the UE; and performing, by the BBU based on the RRU configuration result, networking configuration on the RRU service set that needs to be managed by the BBU.

In this embodiment of the present invention, the BBU receives a configuration result, of an RRU service set in a subnet that needs to be managed by the BBU, delivered by a networking apparatus, to complete networking configuration of an RRU that needs to be managed by the BBU, where each BBU provides a service only for an RRU that needs to be managed by the BBU.

Figure 10:
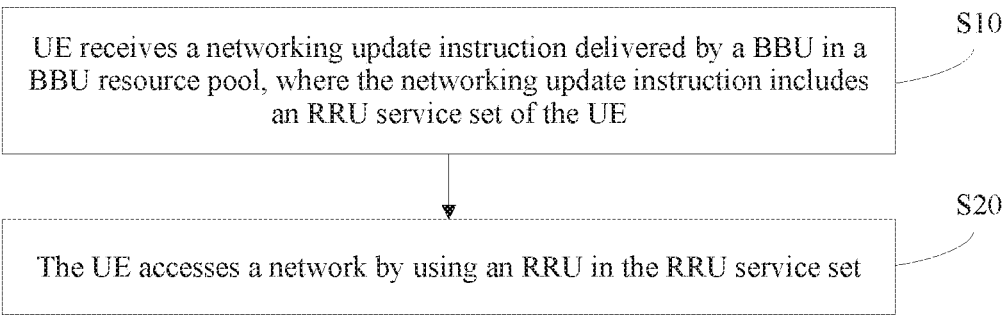
FIG. 10 is a schematic flowchart of a network access method according to an embodiment of the present invention.

Corresponding to the networking method provided in the embodiments of the present invention, the embodiments of the present invention further provide a network access method. FIG. 10 is a schematic flowchart of a network access method according to an embodiment of the present invention. The network access method is specifically performed by UE, to implement network access of the LIE. As shown in FIG. 10, the network access method may mainly include the following steps:

Step S10: The UE receives a networking update instruction delivered by a BBU in a BBU resource pool, where the networking update instruction includes an RRU service set of the UE.

Step S20: The UE accesses a network by using an RRU in the RRU service set.

In the network access method according to this embodiment of the present invention, when the UE accesses the network, the UE does not need to determine the RRU that the UE needs to access, and the UE directly accesses the network based on the RRU service set in the networking update instruction that is delivered by the BBU and that is received by the UE. This reduces resource consumption of the UE compared to an existing solution in which a LIE end determines and selects an RRU that the UE needs to access.

In an optional embodiment of the present invention, before the UE receives the networking update instruction delivered by the BBU in the BBU resource pool, the method further includes:

the UE reports, to a BBU that is in the BBU resource pool and to which the UE currently belongs, an identifier of each RRU corresponding to reference signal received power measured by the UE.

In an optional embodiment of the present invention, that the UE reports, to a BBU that is in the BBU resource pool and to which the UE currently belongs, an identifier of each RRU corresponding to reference signal received power measured by the UE includes:

the UE reports, to the BBU that is in the BBU resource pool and to which the UE currently belongs, an identifier of each RRU corresponding to reference signal received power that is of the reference signal received power measured by the UE and that is greater than a preset power threshold.

It can be understood that the network access method according to this embodiment of the present invention corresponds to the networking method according to the embodiments of the present invention, and for specific descriptions of steps performed on a UE side in each step of the network access method, reference may be made to detailed descriptions of a corresponding pail in the networking method. Details are not described herein again.

Figure 11:
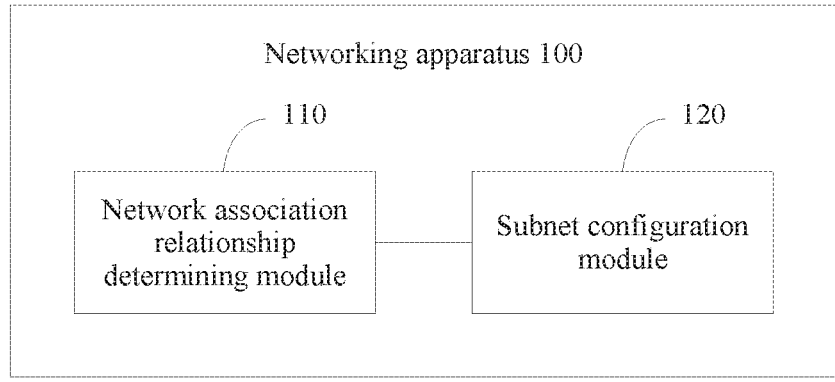
FIG. 11 is a schematic block diagram of a networking apparatus according to an embodiment of the present invention.

FIG. 11 is a schematic block diagram of a networking apparatus 100 according to an embodiment of the present invention. The networking apparatus 100 may be specifically implemented as a data processing device or a processor. As shown in FIG. 11, the networking apparatus 100 may include a network association relationship determining module 110 and a subnet configuration module 120.

The network association relationship determining module 110 is configured to determine a network association relationship between each remote radio unit RRU and each user equipment UE of all RRUs and all UEs managed by a baseband processing unit BBU resource pool, where the network association relationship includes whether the RRU is capable of providing a service for the UE, or reference signal received power that corresponds to each RRU and that is reported by UE is used to represent a relationship between the UE and the RRU.

The subnet configuration module 120 is configured to configure all the RRUs to M subnets based on the network association relationship between each RRU and each UE, where M≥1, and M is not greater than a quantity of all the RRUs.

In an optional embodiment of the present invention, the network association relationship determining module 110 may be specifically configured to:

obtain a network association relationship between each of all the RRUs and each UE that is managed by each BBU in the BBU resource pool; and determine, based on the network association relationship between each of all the RRUs and each UE that is managed by each BBU in the BBU resource pool, the network association relationship between each RRU and each UE of all the RRUs and all the UEs managed by the BBU resource pool.

In an optional embodiment of the present invention, the network association relationship determining module 110 may be specifically configured to:

obtain the reference signal received power that corresponds to each RRU and that is measured and reported by each UE; and determine, based on the reference signal received power that corresponds to each RRU and that is measured and reported by each UE, the network association relationship between each RRU and each UE of all the RRUs and all the UEs managed by the BBU resource pool.

In an optional embodiment of the present invention, if the network association relationship is whether the RRU is capable of providing a service for the UE, the network association relationship determining module 110 may be specifically configured to:

obtain an identifier of each RRU corresponding to the reference signal received power that is measured and reported by each UE;

determine, based on the identifier of each RRU corresponding to the reference signal received power that is measured and reported by each UE, an RRU that is capable of providing a service for the UEs managed by the BBU resource pool; and determine, based on the RRU that is capable of providing a service for the UEs managed by the BBU resource pool, the network association relationship between each RRU and each UE of all the RRUs and all the UEs managed by the BBU resource pool.

In an optional embodiment of the present invention, the identifier of each RRU corresponding to the reference signal received power that is measured and reported by each UE may be an identifier of each RRU corresponding to reference signal received power that is of the reference signal received power measured by the UE and that is greater than a preset power threshold.

In an optional embodiment of the present invention, the subnet configuration module 120 may be specifically configured to:

determine a value of M; and configure all the RRUs to M subnets according to a clustering algorithm and based on the network association relationship between each RRU and each UE.

In an optional embodiment of the present invention, when configuring all the RRUs to M subnets according to the clustering algorithm and based on the network association relationship between each RRU and each UE, the subnet configuration module may be specifically configured to:

establish a current relational matrix of the BBU resource pool based on the network association relationship between each RRU and each UE, where a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and cluster, according to the clustering algorithm, RRUs and UEs corresponding to elements in the current relational matrix, and configure all the RRUs to M subnets based on a clustering result.

In an optional embodiment of the present invention, when clustering, according to the clustering algorithm, the RRUs and the UEs corresponding to the elements in the current relational matrix, and configuring all the RRUs to M subnets based on the clustering result, the subnet configuration module 120 may be specifically configured to:

calculate a Laplacian matrix of the current relational matrix and all eigenvectors of the Laplacian matrix;

sort all the eigenvectors in ascending order of eigenvalues corresponding to the eigenvectors, and construct an eigenmatrix by using each of first M eigenvectors obtained after the ascending sorting as one column;

rotate subspace corresponding to the eigenmatrix, to obtain a subnet matrix that corresponds to the eigenmatrix and that has only one nonzero element in each row, where each column in the subnet matrix corresponds to one subnet, and the nonzero element in each column is an RRU and UE of a subnet corresponding to the column; and configure the RRU of each subnet to the corresponding subnet.

In an optional embodiment of the present invention, when rotating the subspace corresponding to the eigenmatrix, the subnet configuration module 120 may be specifically configured to:

rotate the subspace corresponding to the eigenmatrix by a minimum distance.

In an optional embodiment of the present invention, when determining the value of M, the subnet configuration module is specifically configured to:

determine, as the value of M based on a value range of M, a maximum value that is within the value range and that meets a preset subnetting rule, where the subnetting rule includes:

a reciprocal of a sum of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

In an optional embodiment of the present invention, the Laplacian matrix is a random walk Laplacian matrix.

In an optional embodiment of the present invention, the maximum value is a maximum numerical value that is found in the value range by using a binary search method and that meets the subnetting rule.

Figure 12:
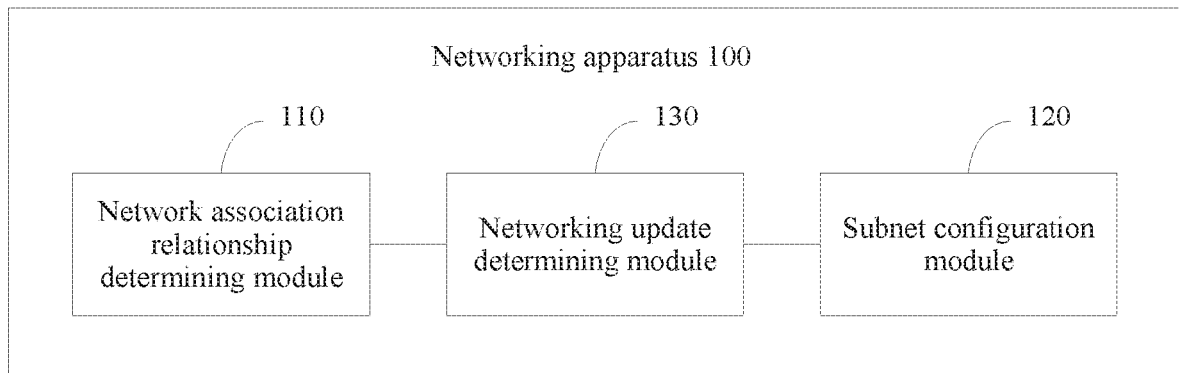
FIG. 12 is a schematic block diagram of a networking apparatus according to another embodiment of the present invention.

FIG. 12 is a schematic diagram of a framework of a networking apparatus according to another embodiment of the present invention. As shown in FIG. 12, on a basis of the descriptions of FIG. 11, the networking apparatus 100 may further include a networking update determining module 130.

The networking update determining module 130 is configured to: before cluster analysis is performed, according to the clustering algorithm, on the RRUs and the UEs corresponding to the elements in the current relational matrix, determine, based on the current relational matrix and a relational matrix of a previous moment, that the current relational matrix meets a preset networking update condition.

In an optional embodiment of the present invention, the networking update condition may include:

an L2 norm of a matrix that is obtained by performing a subtraction operation between the relational matrix of the previous moment and the current relational matrix is greater than a specified threshold.

Figure 13:
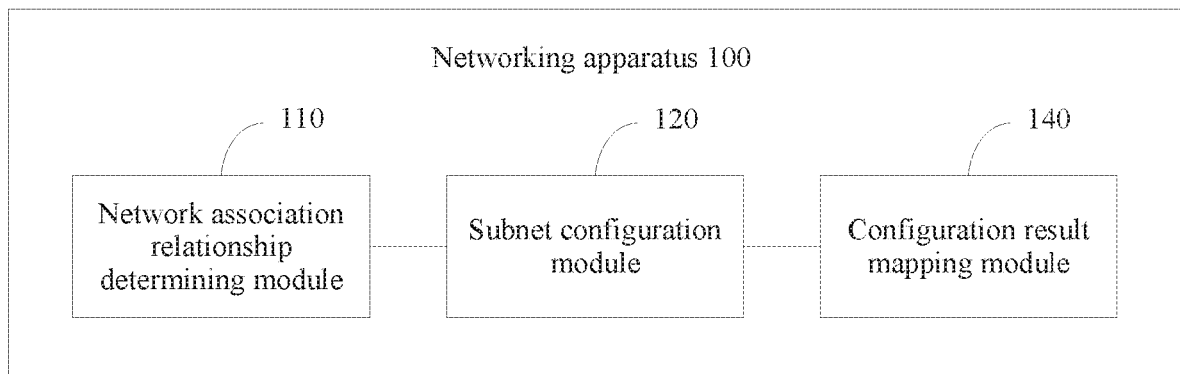
FIG. 13 is a schematic block diagram of a networking apparatus according to still another embodiment of the present invention.

FIG. 13 is a schematic diagram of a framework of a networking apparatus according to still another embodiment of the present invention. As shown in FIG. 13, the networking apparatus 100 may further include a configuration result mapping module 140.

The configuration result mapping module 140 is configured to: after all the RRUs are configured to M subnets based on the network association relationship between each RRU and each UE, map an RRU of each subnet to a BBU in the BBU resource pool based on an RRU configuration result of the M subnets, so that the BBU performs networking configuration for the RRU of the corresponding subnet based on a mapping result, where one subnet corresponds to at least one BBU.

In an optional embodiment of the present invention, the configuration result mapping module 140 may be specifically configured to:

when M is greater than a quantity of BBUs in the BBU resource pool, map an RRU of each subnet to a BBU in the BBU resource pool based on a quantity of RRUs in each subnet, where after the mapping, a difference between a maximum value of corresponding RRU quantities of the BBUs and a minimum value of the corresponding RRU quantities of the BBUs is less than a specified value.

In an optional embodiment of the present invention, the BBU of each subnet serves only the RRU in the corresponding subnet, and the RRU in each subnet provides a service only for UE in a coverage area of the corresponding subnet.

It can be understood that the networking apparatus 100 according to the embodiments of the present invention may correspond to an execution body of the dynamic networking method according to the embodiments of the present invention, and the foregoing operations and/or functions of the modules in the networking apparatus 100 are respectively intended to implement corresponding processes of the networking method according to the embodiments of the present invention. For brevity, details are not described herein.

Figure 14:
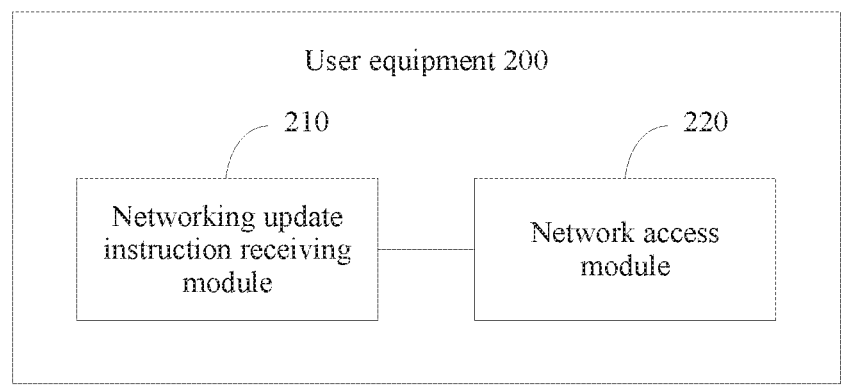

Corresponding to the network access method provided in the embodiments of the present invention, the embodiments of the present invention further provide user equipment. FIG. 14 is a schematic diagram of a framework of user equipment 200 according to an embodiment of the present invention. As shown in FIG. 14, the user equipment 200 may include a networking update instruction receiving module 210 and a network access module 220.

The networking update instruction receiving module 210 is configured to receive a networking update instruction delivered by a BBU in a BBU resource pool, where the networking update instruction includes an RRU service set of the UE.

The network access module 220 is configured to access a network by using an RRU in the RRU service set.

According to an optional embodiment of the present invention, the user equipment 200 may further include an RRU identifier reporting module.

The RRU identifier reporting module is configured to: before the networking update instruction delivered by the BBU in the BBU resource pool is received, report an identifier of each RRU corresponding to measured reference signal received power to a BBU that is in the BBU resource pool and to which the UE currently belongs.

According to an optional embodiment of the present invention, the RRU identifier reporting module is specifically configured to: report, to the BBU that is in the BBU resource pool and to which the UE currently belongs, an identifier of each RRU corresponding to reference signal received power that is of the measured reference signal received power and that is greater than a preset power threshold.

It can be understood that the user equipment 200 according to the embodiments of the present invention may correspond to an execution body of the network access method according to the embodiments of the present invention, and the foregoing operations and/or functions of the modules in the user equipment 200 are respectively intended to implement corresponding processes of the network access method according to the embodiments of the present invention. For brevity, details are not described herein.

FIG. 15 is a schematic block diagram of a networking device 300 according to an embodiment of the present invention. As shown in FIG. 15, the networking device 300 may include a processor 301, a memory 302, and a communications interface 303. The memory 302 is configured to store executable program code. The processor 301 reads the executable program code stored in the memory 302 to run a program corresponding to the executable program code, thereby performing the networking method according to the embodiments of the present invention. The communications interface 303 is configured to communicate with an external device. The networking device 300 may further include a bus 304. The bus 304 is configured to connect the processor 301, the memory 302, and the communications interface 303, so that the processor 301, the memory 302, and the communications interface 303 communicate with each other by using the bus 304.

The networking device 300 according to this embodiment of the present invention may correspond to the execution body of the networking method according to the embodiments of the present invention, and the foregoing operations and/or functions of the units in the networking device 200 are respectively intended to implement corresponding processes of the networking method according to the embodiments of the present invention. For brevity, details are not described herein.

It can be understood that the networking device 300 according to this embodiment of the present invention may be deployed separately, and the networking device 200 communicates with a BBU in a BBU resource pool by using the communications interface 303; or the networking device 200 may be directly deployed in the BBU resource pool and communicate with a BBU by using the communications interface 303, to implement the networking method according to the embodiments of the present invention.

FIG. 16 is a schematic diagram of a logical architecture of a BBU resource pool 400 according to an embodiment of the present invention. In the figure, a BBU monitoring board 410 may be specifically implemented as the networking device 300 in FIG. 15. The BBU monitoring board 410 may be connected to each BBU 420 by using a data bus, and the BBU 420 is connected to a fiber backhaul network 500 by using a data bus. A large quantity of RRUs 600 access the fiber backhaul network 500 to communicate with BBUs 320 in subnets in which the RRUs 600 are located.

An embodiment of the present invention further provides a computer readable storage medium, where the readable storage medium stores an instruction, and when run on a computer, the instruction enables the computer to perform the networking method according to any embodiment of the present invention.

An embodiment of the present invention further provides user equipment, where the user equipment includes a processor and a memory. The memory stores a computer program, and the processor is configured to execute the computer program in the memory to implement the network access method according to any embodiment of the present invention.

An embodiment of the present invention further provides a computer readable storage medium, where the readable storage medium stores an instruction, and when run on a computer, the instruction enables the computer to perform the network access method according to any embodiment of the present invention.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the processes or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Described implementations of the subject matter can include one or more features, alone or in combination.

For example, in a first implementation, a computer-implemented networking method, comprising: determining a network association relationship between each remote radio unit RRU and each user equipment UE of all RRUs and all UEs managed by a baseband processing unit BBU resource pool, wherein the network association relationship comprises whether the RRU is capable of providing a service for the UE, or reference signal received power that corresponds to each RRU and that is reported by UE is used to represent a relationship between the UE and the RRU; and configuring all the RRUs to M subnets based on the network association relationship between each RRU and each UE, whereinM≥1, and M is not greater than a quantity of all the RRUs.

The foregoing and other described implementations can each, optionally, include one or more of the following features:

A first feature, combinable with any of the following features, wherein the determining a network association relationship between each remote radio unit RRU and each user equipment UE of all RRUs and all UEs managed by a baseband processing unit BBU resource pool comprises: obtaining a network association relationship between each of all the RRUs and each UE that is managed by each BBU in the BBU resource pool; and determining, based on the network association relationship between each of all the RRUs and each UE that is managed by each BBU in the BBU resource pool, the network association relationship between each RRU and each UE of all the RRUs and all the UEs managed by the BBU resource pool.

A second feature, combinable with any of the previous or following features, wherein the determining a network association relationship between each remote radio unit RRU and each user equipment UE of all RRUs and all UEs managed by a baseband processing unit BBU resource pool comprises: obtaining the reference signal received power that corresponds to each RRU and that is measured and reported by each UE; and determining, based on the reference signal received power that corresponds to each RRU and that is measured and reported by each UE, the network association relationship between each RRU and each UE of all the RRUs and all the UEs managed by the BBU resource pool.

A third feature, combinable with any of the previous or following features, wherein if the network association relationship is whether the RRU is capable of providing a service for the UE, the determining a network association relationship between each remote radio unit RRU and each user equipment UE of all RRUs and all UEs managed by a baseband processing unit BBU resource pool comprises: obtaining an identifier of each RRU corresponding to the reference signal received power that is measured and reported by each UE; determining, based on the identifier of each RRU corresponding to the reference signal received power that is measured and reported by each UE, an RRU that is capable of providing a service for the UEs managed by the BBU resource pool; and determining, based on the RRU that is capable of providing a service for the UEs managed by the BBU resource pool, the network association relationship between each RRU and each UE of all the RRUs and all the UEs managed by the BBU resource pool.

A fourth feature, combinable with any of the previous or following features, wherein the identifier of each RRU corresponding to the reference signal received power that is measured and reported by each UE is an identifier of each RRU corresponding to reference signal received power that is of the reference signal received power measured by the UE and that is greater than a preset power threshold.

A fifth feature, combinable with any of the previous or following features, wherein the configuring all the RRUs to M subnets based on the network association relationship between each RRU and each UE comprises: determining a value of M; and configuring all the RRUs to M subnets according to a clustering algorithm and based on the network association relationship between each RRU and each UE.

A sixth feature, combinable with any of the previous or following features, wherein the configuring all the RRUs to M subnets according to a clustering algorithm and based on the network association relationship between each RRU and each UE comprises: establishing a current relational matrix of the BBU resource pool based on the network association relationship between each RRU and each UE, wherein a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and clustering, according to the clustering algorithm, RRUs and UEs corresponding to elements in the current relational matrix, and configuring all the RRUs to M subnets based on a clustering result.

A seventh feature, combinable with any of the previous or following features, wherein the clustering, according to the clustering algorithm, RRUs and UEs corresponding to elements in the current relational matrix, and configuring all the RRUs to M subnets based on a clustering result comprises: calculating a Laplacian matrix of the current relational matrix and all eigenvectors of the Laplacian matrix; sorting all the eigenvectors in ascending order of eigenvalues corresponding to the eigenvectors, and constructing an eigenmatrix by using each of first M eigenvectors obtained after the ascending sorting as one column; rotating subspace corresponding to the eigenmatrix, to obtain a subnet matrix that corresponds to the eigenmatrix and that has only one nonzero element in each row, wherein each column in the subnet matrix corresponds to one subnet, and the nonzero element in each column is an RRU and UE of a subnet corresponding to the column; and configuring the RRU of each subnet to the corresponding subnet.

An eight feature, combinable with any of the previous or following features, wherein the rotating subspace corresponding to the eigenmatrix comprises: rotating the subspace corresponding to the eigenmatrix by a minimum distance.

A ninth feature, combinable with any of the previous or following features, wherein the determining a value of M comprises: determining, as the value of M based on a value range of M, a maximum value that is within the value range and that meets a preset subnetting rule, wherein the subnetting rule comprises: a reciprocal of a SUM of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

A tenth feature, combinable with any of the previous or following features, wherein the Laplacian matrix is a random walk Laplacian matrix.

An eleventh feature, combinable with any of the previous or following features, wherein the maximum value is a maximum numerical value that is found in the value range by using a binary search method and that meets the subnetting rule.

A twelfth feature, combinable with any of the previous or following features, before the clustering, according to the clustering algorithm, RRUs and UEs corresponding to elements in the current relational matrix, further comprising: determining, based on the current relational matrix and a relational matrix of a previous moment, that the current relational matrix meets a preset networking update condition.

A thirteenth feature, combinable with any of the previous or following features, wherein the networking update condition comprises: an L2 norm of a matrix that is obtained by performing a subtraction operation between the relational matrix of the previous moment and the current relational matrix is greater than a specified threshold.

A fourteenth feature, combinable with any of the previous or following features, after the configuring all the RRUs to M subnets based on the network association relationship between each RRU and each UE, further comprising: mapping an RRU of each subnet to a BBU in the BBU resource pool based on an RRU configuration result of the M subnets, so that the BBU performs networking configuration for the RRU of the corresponding subnet based on a mapping result, wherein one subnet corresponds to at least one BBU.

A fifteenth feature, combinable with any of the previous or following features, wherein the mapping an RRU of each subnet to a BBU in the BBU resource pool comprises: if M is greater than a quantity of BBUs in the BBU resource pool, mapping an RRU of each subnet to a BBU in the BBU resource pool based on a quantity of RRUs in each subnet, wherein after the mapping, a difference between a maximum value of corresponding RRU quantities of the BBUs and a minimum value of the corresponding RRU quantities of the BBUs is less than a specified value.

A sixteenth feature, combinable with any of the previous or following features, wherein a BBU in each subnet serves only an RRU in the corresponding subnet, and the RRU in each subnet provides a service only for UE in a coverage area of the corresponding subnet.

In a second implementation, a computer-implemented network access method, comprising: wherein the network access method is performed by UE, and comprises: receiving, by the UE, a networking update instruction delivered by a BBU in a BBU resource pool, wherein the networking update instruction comprises an RRU service set of the UE; and accessing, by the UE, a network by using an RRU in the RRU service set.

The foregoing and other described implementations can each, optionally, include one or more of the following features:

A first feature, combinable with any of the following features, before the receiving, by the UE, a networking update instruction delivered by a BBU in a BBU resource pool, further comprising: reporting, by the UE, an identifier of each RRU corresponding to reference signal received power measured by the UE to a BBU that is in the BBU resource pool and to which the UE currently belongs.

A second feature, combinable with any of the previous or following features, wherein the reporting, by the UE, an identifier of each RRU corresponding to reference signal received power measured by the UE to a BBU that is in the BBU resource pool and to which the UE currently belongs comprises: reporting, by the UE to the BBU that is in the BBU resource pool and to which the UE currently belongs, an identifier of each RRU corresponding to reference signal received power that is of the reference signal received power measured by the UE and that is greater than a preset power threshold.

In a third implementation, a networking apparatus, comprising: a network association relationship determining module, configured to determine a network association relationship between each remote radio unit RRU and each user equipment UE of all RRUs and all UEs managed by a baseband processing unit BBU resource pool, wherein the network association relationship comprises whether the RRU is capable of providing a service for the UE, or reference signal received power that corresponds to each RRU and that is reported by UE is used to represent a relationship between the UE and the RRU; and a subnet configuration module, configured to configure all the RRUs to M subnets based on the network association relationship between each RRU and each UE, wherein M≥1, and M is not greater than a quantity of all the RRUs.

The foregoing and other described implementations can each, optionally, include one or more of the following features:

A first feature, combinable with any of the following features, wherein if the network association relationship is whether the RRU is capable of providing a service for the UE, the network association relationship determining module is specifically configured to: obtain an identifier of each RRU corresponding to the reference signal received power that is measured and reported by each UE; determine, based on the identifier of each RRU corresponding to the reference signal received power that is measured and reported by each UE, an RRU that is capable of providing a service for the UEs managed by the BBU resource pool; and determine, based on the RRU that is capable of providing a service for the UEs managed by the BBU resource pool, the network association relationship between each RRU and each UE of all the RRUs and all the UEs managed by the BBU resource pool.

A second feature, combinable with any of the previous or following features, wherein the subnet configuration module is specifically configured to: determine a value of M; and configure all the RRUs to M subnets according to a clustering algorithm and based on the network association relationship between each RRU and each UE.

A third feature, combinable with any of the previous or following features, wherein when configuring all the RRUs to M subnets according to the clustering algorithm and based on the network association relationship between each RRU and each UE, the subnet configuration module is specifically configured to: establish a current relational matrix of the BBU resource pool based on the network association relationship between each RRU and each UE, wherein a quantity of rows in the current relational matrix is a quantity of all the UEs, a quantity of columns in the current relational matrix is a quantity of all the RRUs, and an element in the current relational matrix represents a network association relationship between an RRU and UE that correspond to a location at which the element is located; and cluster, according to the clustering algorithm, RRUs and UEs corresponding to elements in the current relational matrix, and configure all the RRUs to M subnets based on a clustering result.

A fourth feature, combinable with any of the previous or following features, wherein when clustering, according to the clustering algorithm, the RRUs and the UEs corresponding to the elements in the current relational matrix, and configuring all the RRUs to M subnets based on the clustering result, the subnet configuration module is specifically configured to: calculate a Laplacian matrix of the current relational matrix and all eigenvectors of the Laplacian matrix; sort all the eigenvectors in ascending order of eigenvalues corresponding to the eigenvectors, and construct an eigenmatrix by using each of first M eigenvectors obtained after the ascending sorting as one column; rotate subspace corresponding to the eigenmatrix, to obtain a subnet matrix that corresponds to the eigenmatrix and that has only one nonzero element in each row, wherein each column in the subnet matrix corresponds to one subnet, and the nonzero element in each column is an RRU and UE of a subnet corresponding to the column; and configure the RRU of each subnet to the corresponding subnet.

A fifth feature, combinable with any of the previous or following features, wherein when rotating the subspace corresponding to the eigenmatrix, the subnet configuration module is specifically configured to: rotate the subspace corresponding to the eigenmatrix by a minimum distance.

A sixth feature, combinable with any of the previous or following features, wherein when determining the value of M, the subnet configuration module is specifically configured to: determine, as the value of M based on a value range of M, a maximum value that is within the value range and that meets a preset subnetting rule, wherein the subnetting rule comprises: a reciprocal of a sum of signal-to-interference ratios of all the configured subnets is not greater than a preset threshold, and a signal-to-interference ratio of a subnet is equal to a ratio of a sum of all elements in the current relational matrix that correspond to RRUs and UEs belonging to the subnet at the same time to a sum of all elements in the current relational matrix that correspond to RRUs and UEs not belonging to the subnet at the same time.

A seventh feature, combinable with any of the previous or following features, wherein the Laplacian matrix is a random walk Laplacian matrix.

An eighth feature, combinable with any of the previous or following features, wherein the networking apparatus further comprises: a networking update determining module, configured to: before cluster analysis is performed, according to the clustering algorithm, on the RRUs and the UEs corresponding to the elements in the current relational matrix, determine, based on the current relational matrix and a relational matrix of a previous moment, that the current relational matrix meets a preset networking update condition.

A ninth feature, combinable with any of the previous or following features, wherein the networking update condition comprises: an L2 norm of a matrix that is obtained by performing a subtraction operation between the relational matrix of the previous moment and the current relational matrix is greater than a specified threshold.

A tenth feature, combinable with any of the previous or following features, wherein the networking apparatus further comprises: a configuration result mapping module, configured to: after all the RRUs are configured to M subnets based on the network association relationship between each RRU and each UE, map an RRU of each subnet to a BBU in the BBU resource pool based on an RRU configuration result of the M subnets, so that the BBU performs networking configuration for the RRU of the corresponding subnet based on a mapping result, wherein one subnet corresponds to at least one BBU.

An eleventh feature, combinable with any of the previous or following features, wherein the configuration result mapping module is specifically configured to: when M is greater than a quantity of BBUs in the BBU resource pool, map an RRU of each subnet to a BBU in the BBU resource pool based on a quantity of RRUs in each subnet, wherein after the mapping, a difference between a maximum value of corresponding RRU quantities of the BBUs and a minimum value of the corresponding RRU quantities of the BBUs is less than a specified value.

In a fourth implementation, user equipment, comprising: a networking update instruction receiving module, configured to receive a networking update instruction delivered by a BBU in a BBU resource pool, wherein the networking update instruction comprises an RRU service set of the UE; and a network access module, configured to access a network by using an RRU in the RRU service set.

In some implementations, these general and specific aspects may be implemented using a system, a processing apparatus, a computer-readable storage medium, a computer program product, or any combination thereof. For example, the processing apparatus comprises one or more of a processor, an interface, or a memory, wherein the memory stores code, the memory is disposed in the processor; or the memory and the processor are independently disposed.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A networking method, comprising:
   determining a network association relationship between each remote radio unit (RRU) and each user equipment (UE) for all RRUs and all UEs managed by a baseband processing unit (BBU) resource pool, wherein the network association relationship comprises whether the RRU is capable of providing a service for the UE, or a relationship between the UE and the RRU represented by a reference signal received power that corresponds to each RRU and that is reported by the UE; and
   configuring all the RRUs to M subnets based on the network association relationship between each RRU and each UE, wherein M≥1, and M is less than a quantity of all the RRUs, wherein configuring all the RRUs to M subnets based on the network association relationship between each RRU and each UE comprises:
      establishing a current relational matrix of the BBU resource pool based on the network association relationship between each RRU and each UE, wherein a quantity of rows in the current relational matrix is a quantity of all the UEs, a quantity of columns in the current relational matrix is a quantity of all the RRUs, and an element in the current relational matrix represents a network association relationship between an RRU and UE that corresponds to a location at which the element is located;
      calculating a Laplacian matrix of the current relational matrix and all eigenvectors of the Laplacian matrix;
      clustering, according to a clustering algorithm and based on the all eigenvectors of the Laplacian matrix, RRUs and UEs corresponding to elements in the current relational matrix to generate a clustering result; and
      configuring all the RRUs to M subnets based on the clustering result,
   wherein if the network association relationship is whether the RRU is capable of providing a service for the UE, determining the network association relationship between each RRU and each UE for all the RRUs and all the UEs managed by the BBU resource pool comprises:
      obtaining an identifier of each RRU corresponding to the reference signal received power that is measured and reported by each UE;
      determining, based on the identifier of each RRU corresponding to the reference signal received power that is measured and reported by each UE, an RRU that is capable of providing a service for the UEs managed by the BBU resource pool; and
      determining, based on the RRU that is capable of providing the service for the UEs managed by the BBU resource pool, the network association relationship between each RRU and each UE for all the RRUs and all the UEs managed by the BBU resource pool.

2. The networking method according to claim 1, wherein determining the network association relationship between each RRU and each UE for all the RRUs and all the UEs managed by the BBU resource pool comprises:

obtaining a network association relationship between each of all the RRUs and each UE that is managed by each BBU in the BBU resource pool; and determining, based on the network association relationship between each of all the RRUs and each UE that is managed by each BBU in the BBU resource pool, the network association relationship between each RRU and each UE for all the RRUs and all the UEs managed by the BBU resource pool.

3. The networking method according to claim 1, wherein determining the network association relationship between each RRU and each UE for all the RRUs and all the UEs managed by the BBU resource pool comprises:

obtaining the reference signal received power that corresponds to each RRU and that is measured and reported by each UE; and determining, based on the reference signal received power that corresponds to each RRU and that is measured and reported by each UE, the network association relationship between each RRU and each UE for all the RRUs and all the UEs managed by the BBU resource pool.

4. The networking method according to claim 1, wherein the identifier of each RRU corresponding to the reference signal received power that is measured and reported by each UE is an identifier of each RRU corresponding to reference signal received power that is of the reference signal received power measured by the UE and that is greater than a preset power threshold.

5. The networking method according to claim 1, further comprising:

determining a value of M.

6. The networking method according to claim 1, wherein clustering, according to the clustering algorithm and based on the all eigenvectors of the Laplacian matrix, RRUs and UEs corresponding to elements in the current relational matrix, and configuring all the RRUs to M subnets based on the clustering result comprises:

sorting all the eigenvectors in ascending order of eigenvalues corresponding to the eigenvectors;

constructing an eigenmatrix using each of first M eigenvectors obtained after sorting all the eigenvectors in ascending order as one column;

rotating subspace corresponding to the eigenmatrix, to obtain a subnet matrix that corresponds to the eigenmatrix and that has only one nonzero element in each row, wherein each column in the subnet matrix corresponds to one subnet, and the nonzero element in each column is an RRU and UE of a subnet corresponding to the column; and configuring an RRU of each subnet to a corresponding subnet.

7. The networking method according to claim 1, after configuring all the RRUs to M subnets based on the network association relationship between each RRU and each UE, further comprising:

mapping an RRU of each subnet to a BBU in the BBU resource pool based on an RRU configuration result of the M subnets, wherein a result of the mapping causes the BBU to perform networking configuration for the RRU of a corresponding subnet, and wherein one subnet corresponds to at least one BBU.

8. The networking method according to claim 7, wherein mapping the RRU of each subnet to the BBU in the BBU resource pool comprises:

if M is greater than a quantity of BBUs in the BBU resource pool, mapping an RRU of each subnet to a BBU in the BBU resource pool based on a quantity of RRUs in each subnet, wherein after the mapping, a difference between a maximum value of corresponding RRU quantities of the BBUs and a minimum value of the corresponding RRU quantities of the BBUs is less than a specified value.

9. The networking method according to claim 7, wherein a BBU in each subnet serves only an RRU in the corresponding subnet, and the RRU in each subnet provides a service only for UE in a coverage area of the corresponding subnet.

10. A networking apparatus, comprising:

at least one processor; and a non-transitory computer-readable storage medium coupled to the at least one processor and storing programming instructions for execution by the at least one processor, wherein the programming instructions cause the at least one processor to:

determine a network association relationship between each remote radio unit (RRU) and each user equipment (UE) for all RRUs and all UEs managed by a baseband processing unit (BBU) resource pool, wherein the network association relationship comprises whether the RRU is capable of providing a service for the UE, or a relationship between the UE and the RRU represented by a reference signal received power that corresponds to each RRU and that is reported by the UE; and configure all the RRUs to M subnets based on the network association relationship between each RRU and each UE, wherein M≥1, and M is less than a quantity of all the RRUs, wherein configuring all the RRUs to M subnets based on the network association relationship between each RRU and each UE comprises:

establishing a current relational matrix of the BBU resource pool based on the network association relationship between each RRU and each UE, wherein a quantity of rows in the current relational matrix is a quantity of all the UEs, a quantity of columns in the current relational matrix is a quantity of all the RRUs, and an element in the current relational matrix represents a network association relationship between an RRU and UE that corresponds to a location at which the element is located;

calculating a Laplacian matrix of the current relational matrix and all eigenvectors of the Laplacian matrix;

clustering, according to a clustering algorithm and based on the all eigenvectors of the Laplacian matrix, RRUs and UEs corresponding to elements in the current relational matrix to generate a clustering result; and configuring all the RRUs to M subnets based on the clustering result, wherein if the network association relationship is whether the RRU is capable of providing a service for the UE, determining the network association relationship between each RRU and each UE for all the RRUs and all the UEs managed by the BBU resource pool comprises:

obtaining an identifier of each RRU corresponding to the reference signal received power that is measured and reported by each UE;

determining, based on the identifier of each RRU corresponding to the reference signal received power that is measured and reported by each UE, an RRU that is capable of providing a service for the UEs managed by the BBU resource pool; and determining, based on the RRU that is capable of providing the service for the UEs managed by the BBU resource pool, the network association relationship between each RRU and each UE for all the RRUs and all the UEs managed by the BBU resource pool.

11. The networking apparatus according to claim 10, wherein the programming instructions cause the at least one processor to:
determine a value of M.

12. The networking apparatus according to claim 11, wherein the programming instructions cause the at least one processor to:
sort all the eigenvectors in ascending order of eigenvalues corresponding to the eigenvectors;
construct an eigenmatrix using each of first M eigenvectors obtained after sorting all the eigenvectors in ascending order as one column;
rotate subspace corresponding to the eigenmatrix, to obtain a subnet matrix that corresponds to the eigenmatrix and that has only one nonzero element in each row, wherein each column in the subnet matrix corresponds to one subnet, and the nonzero element in each column is an RRU and UE of a subnet corresponding to the column; and
configure an RRU of each subnet to a corresponding subnet.

13. The networking apparatus according to claim 10, wherein the programming instructions cause the at least one processor to:
after all the RRUs are configured to the M subnets based on the network association relationship between each RRU and each UE, map an RRU of each subnet to a BBU in the BBU resource pool based on an RRU configuration result of the M subnets, wherein a result of the mapping cause the BBU to perform networking configuration for the RRU of a corresponding subnet, and wherein one subnet corresponds to at least one BBU.

14. The networking apparatus according to claim 13, wherein the programming instructions cause the at least one processor to:
if M is greater than a quantity of BBUs in the BBU resource pool, map an RRU of each subnet to a BBU in the BBU resource pool based on a quantity of RRUs in each subnet, wherein after the mapping, a difference between a maximum value of corresponding RRU quantities of the BBUs and a minimum value of the corresponding RRU quantities of the BBUs is less than a specified value.

\* \* \* \* \*